United States Patent
Park et al.

(10) Patent No.: US 8,588,307 B2
(45) Date of Patent: Nov. 19, 2013

(54) METHOD AND APPARATUS FOR ENCODING AND DECODING MODE INFORMATION

(75) Inventors: Sung-bum Park, Seongnam-si (KR); Jung-woo Kim, Seoul (KR); Dai-woong Choi, Seoul (KR); Jae-won Yoon, Seoul (KR); Jun-ho Cho, Siheung-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 443 days.

(21) Appl. No.: 12/884,719

(22) Filed: Sep. 17, 2010

(65) Prior Publication Data

US 2011/0064133 A1     Mar. 17, 2011

Related U.S. Application Data

(60) Provisional application No. 61/244,139, filed on Sep. 21, 2009, provisional application No. 61/243,218, filed on Sep. 17, 2009, provisional application No. 61/257,609, filed on Nov. 3, 2009, provisional application No. 61/243,216, filed on Sep. 17, 2009.

(51) Int. Cl.
*H04N 7/30* (2006.01)
*H04N 7/50* (2006.01)

(52) U.S. Cl.
USPC ............ 375/240.16; 375/240.12; 375/240.24

(58) Field of Classification Search
USPC ........................................................ 375/240
See application file for complete search history.

(56) References Cited

U.S. PATENT DOCUMENTS

| | | | |
|---|---|---|---|
| 7,200,275 B2 * | 4/2007 | Srinivasan et al. | 382/239 |
| 7,406,124 B1 * | 7/2008 | Zhao et al. | 375/240.24 |
| 7,483,488 B1 * | 1/2009 | Hsu et al. | 375/240.12 |
| 7,555,167 B2 * | 6/2009 | Srinivasan et al. | 382/239 |
| 8,155,189 B2 * | 4/2012 | Yan | 375/240.13 |
| 8,213,503 B2 * | 7/2012 | Tu et al. | 375/240.03 |
| 2003/0113026 A1 * | 6/2003 | Srinivasan et al. | 382/239 |
| 2003/0169932 A1 | 9/2003 | Li et al. | |
| 2005/0135484 A1 * | 6/2005 | Lee et al. | 375/240.16 |
| 2007/0030911 A1 * | 2/2007 | Yoon | 375/240.25 |
| 2007/0110326 A1 * | 5/2007 | Srinivasan et al. | 382/239 |
| 2007/0133677 A1 * | 6/2007 | Han et al. | 375/240.1 |
| 2007/0160137 A1 | 7/2007 | Guo et al. | |
| 2008/0069216 A1 * | 3/2008 | Hagai et al. | 375/240.14 |
| 2008/0075171 A1 * | 3/2008 | Suzuki | 375/240.16 |
| 2008/0112481 A1 * | 5/2008 | Hsaing et al. | 375/240.03 |

(Continued)

FOREIGN PATENT DOCUMENTS

| KR | 1999-0080293 A | 11/1999 |
|---|---|---|
| WO | 2007/069829 A1 | 6/2007 |
| WO | 2011027256 A1 | 3/2011 |

OTHER PUBLICATIONS

International Search Report, dated May 13, 2011, issued in Application No. PCT/KR2010/006422.

(Continued)

*Primary Examiner* — Christopher S Kelley
*Assistant Examiner* — Asmamaw G Tarko
(74) *Attorney, Agent, or Firm* — Sughrue Mion, PLLC

(57) ABSTRACT

A method and apparatus for decoding hierarchical mode information including mode information indicating whether a current block is encoded in an encoding mode identical to an encoding mode of a plurality of consecutive previous blocks.

18 Claims, 18 Drawing Sheets

(56) References Cited

U.S. PATENT DOCUMENTS

| | | | |
|---|---|---|---|
| 2008/0130990 A1* | 6/2008 | Moriya et al. | 382/166 |
| 2009/0110066 A1* | 4/2009 | Wang et al. | 375/240.12 |
| 2009/0112897 A1* | 4/2009 | Ordentlich et al. | 707/101 |
| 2009/0175350 A1* | 7/2009 | Jeong et al. | 375/240.24 |
| 2009/0262835 A1* | 10/2009 | Srinivasan et al. | 375/240.16 |
| 2010/0309984 A1* | 12/2010 | Liu et al. | 375/240.24 |
| 2011/0064131 A1* | 3/2011 | Park et al. | 375/240.2 |
| 2011/0064132 A1* | 3/2011 | Park et al. | 375/240.2 |
| 2011/0064133 A1* | 3/2011 | Park et al. | 375/240.2 |
| 2011/0064324 A1* | 3/2011 | Park et al. | 382/250 |
| 2011/0064325 A1* | 3/2011 | Park et al. | 382/250 |

OTHER PUBLICATIONS

International Search Report, dated May 18, 2011, issued in Application No. PCT/KR2010/006413.

International Search Report, dated May 18, 2011, issued in Application No. PCT/KR2010/006404.

International Search Report, dated May 20, 2011, issued in Application No. PCT/KR2010/006428.

International Search Report, dated Jun. 15, 2011, issued in Application No. PCT/KR2010/006436.

Bjontegaard, Gisle, et al., "Use of Run-length Coding to Identify Coded Macroblocks", 13 VCEG Meeting, Apr. 2-4, 2001, Austin, TX, Videocoding Experts Goup of ITU-T SG.16, No. VCEG-M29, pp. 1-3.

Jo, Youngsub, et al., "Fast Mode Decision Algorithm Using Efficient Block Skip Techniques for H.264 P Slices", Advances in Multimedia, 2009. MMEDIA '09. First International Conference on IEEE, Piscataway, NJ. Jul. 20, 2009, pp. 92-97.

Laroche, Guillaume, et al., "RD Optimized Coding for Motion Vector Predictor Selection", IEEE Transactions on Circuits and Systems for Video Technology, IEEE Service Center, Piscataway, NJ, US, Dec. 1, 2008, vol. 17, No. 12, pp. 1681-1691.

Lee, Bumshik, et al., "SVC NAL Unit Types for Online Extraction", 21. JVT Meeting; 78. MPEG Meeting; Oct. 20-27, 2006; Hangzhou, CN; (Joint Video Team of ISO/IEC JTC1/SC29/WG11 and ITU-T SG. 16), No. JVT-U080, Oct. 22, 2006, pp. 1-9.

Schwarz, Heiko, et al., "Skip Mode for SVC Slice Data Syntax", 19. JVT Meeting; Mar. 31-Apr. 7, 2006 Geneva, CH; (Joint Videoteam of ISO/IEC JTC1/SC9/WG11 and ITU-T SG.16), No. JVT-S068, Mar. 31, 2006, pp. 1-7.

Sjoberg, Rickard, et al., "Run-length Coding of Skipped Macroblocks", ITU Study Group 16—Video Coding Experts, Apr. 2, 2001, pp. 1-5.

Sullivan, Gary, et al., Meeting Report of the Thirteenth Meeting (Meeting M) of the ITU-T Q.6/16 Video Coding Experts Group (VCEG)—Austin, TX, Apr. 2-4, 2001, No. VCEG-M82d1, Jun. 15, 2001, 34 pages total.

Tanizawa, Akiyuki, et al., "Fast Rate-Distortion Optimized Coding Mode Decision for H.264", Electronics & Communications in Japan, Part III—Fundamentalelectronic Science, Wiley, Hoboken, NJ, US, Jan. 1, 2007, vol. 90, No. 9, pp. 41-55.

Yanagihara, Naofumi, et al., "A Video Coding Scheme With a High Compression Ratio for Consumer Digital VCRs", Consumer Electronics, 1993, Digest of Technical Papers ICCE., International Conference on Rosemont, IL, Jun. 8-10, 1993, pp. 22-23.

Zeng, Wenjun, et al., "Rate Shaping by Block Dropping for Transmission of MPEG-precoded Video over Channels of Dynamic Bandwith", Proceedings of ACM Multimedia 96. Boston, Nov. 18-22, 1996, New York, ACM, Nov. 18, 1996, pp. 385-393.

Communication dated Feb. 1, 2013 issued by the European Patent Office in counterpart European Application No. 10817451.7.

Communication dated Mar. 5, 2013 issued by the European Patent Office in counterpart European Application No. 10817454.1.

Communication dated Mar. 25, 2013 issued by the European Patent Office in counterpart European Application No. 10817449.1.

Communication dated Apr. 4, 2013 issued by the European Patent Office in counterpart European Application No. 10817447.5.

Communication dated Jun. 7, 2013 issued by the European Patent Office in counterpart European Patent Application No. 10817441.8.

* cited by examiner

METHOD AND APPARATUS FOR ENCODING AND DECODING MODE INFORMATION

CROSS-REFERENCE TO RELATED PATENT APPLICATION

This application claims the benefits of U.S. Provisional Patent Application Nos. 61/243,216, filed on Sep. 17, 2009, 61/243,218, filed on Sep. 17, 2009, 61/244,139, filed on Sep. 21, 2009, and 61/257,609, filed on Nov. 3, 2009, in the U.S. Patent and Trademark Office, the disclosures of which are incorporated herein by reference in their entireties.

BACKGROUND

1. Field

Exemplary embodiments relate to a method and apparatus for encoding and decoding mode information, and more particularly, to a method and apparatus for encoding and decoding mode information of an image that is encoded in a plurality of modes.

2. Description of the Related Art

As wireless networks have developed, interconnection technologies between devices in a wireless network have become an issue. Many companies are trying to develop such technologies. In particular, a high definition (HD) interconnection technology for replacing a high definition multimedia interface (HDMI) technology is being standardized in the wireless HD specification, which allows for uncompressed transmission of HD data signals between devices. According to the WiHD specification, various devices, such as televisions (TVs), home theaters, digital versatile disk (DVD) players, Blu-ray players, and camcorders, may be interconnected in a wireless network.

SUMMARY

Exemplary embodiments include a method and apparatus for encoding and decoding mode information of an image that is encoded in a plurality of modes, and a computer-readable recording medium having respectively embodied thereon a program for executing the encoding and decoding methods.

According to an exemplary embodiment, there is provided a method of decoding mode information of a current block of an image, the method including: determining whether an encoding mode of the current block is identical to an encoding mode of a plurality of consecutive previous blocks; in response to determining that the encoding mode of the current block is identical to the encoding mode of the plurality of consecutive previous blocks, determining that a decoding mode of the current block is identical to a decoding mode of the plurality of consecutive previous blocks; and in response to determining that the encoding mode of the current block is not identical to the encoding mode of the plurality of consecutive previous blocks, parsing at least one of first information indicating that the encoding mode of the current block is a first encoding mode and second information indicating that the encoding mode of the current block is one of a second encoding mode and a third encoding mode, and determining a decoding mode of the current block based on the at least one of the parsed first information and the parsed second information, wherein the first encoding mode indicates that the current block is identical to a second block that is encoded prior to the current block, the current block adjacent to the second block in a slice of the image.

The parsing of the at least one of the first information and the second information and the determining the decoding mode may include: parsing the first information; determining whether the encoding mode of the current block is the first encoding mode; in response to determining that encoding mode of the current block is not the first encoding mode, parsing the second information; decoding at least one of the first information and the second information; and determining the decoding mode of the current block based on a result of the decoding the at least one of the first information and the second information.

The second encoding mode may be an encoding mode in which discrete cosine transformation (DCT) is performed on pixel values of the current block to generate coefficients, the coefficients are separated into a plurality of bit planes from a bit plane of most significant bits to a bit plane of least significant bits, and each of the plurality of bit planes is encoded.

The third encoding mode may be an encoding mode in which pixel values of the current block are separated into a plurality of bit planes from a bit plane of most significant bits to a bit plane of least significant bits and each of the plurality of bit planes is encoded.

The determining whether the encoding mode of the current block is identical to the encoding mode of the plurality of consecutive previous blocks may be based on information about a run length that indicates a number of times a predetermined encoding mode is repeated, and the method may further include, in response to determining that the encoding mode of the current block is identical to the encoding mode of the plurality of consecutive previous blocks, parsing the information about the run length for blocks encoded subsequent to the current block having the identical encoding mode.

The information about the run length may include information about run lengths for a plurality of encoding modes that may be used to encode the current block.

According to another exemplary embodiment, there is provided a method of encoding mode information of a current block of an image, the method including: determining an encoding mode of the current block; determining whether the encoding mode of the current block is identical to an encoding mode of a plurality of consecutive previous blocks; in response to determining that the encoding mode of the current block is identical to the encoding mode of the plurality of consecutive previous blocks, encoding information about a run length of the identical encoding mode; and in response to determining that the encoding mode of the current block is not identical to the encoding mode of the plurality of consecutive previous blocks, encoding at least one of first information indicating that the encoding mode of the current block is a first encoding mode and second information indicating that the encoding mode of the current block is one of a second encoding mode and a third encoding mode, wherein the first encoding mode indicates that the current block is identical to a second block that is encoded prior to the first block, the current block adjacent to the second block in a slice of the image.

According to another exemplary embodiment, there is provided an apparatus for decoding mode information of a current block of an image, the apparatus including: a run determination unit that determines whether an encoding mode of the current block is identical to an encoding mode of a plurality of consecutive previous blocks; and a mode determination unit that, in response to determining that the encoding mode of the current block is identical to the encoding mode of the plurality of consecutive previous blocks, determines that a decoding mode of the current block is identical to a decoding mode of the plurality of consecutive previous blocks, and in response to determining that the encoding mode of the current block is not identical to the encoding mode of the plurality of consecutive previous blocks, determines a decoding mode of the current block based on at least one of first information indicating that the encoding mode of the current block a first encoding mode and second information indicating that encoding mode of the current block is one of a second encoding mode and a third encoding mode, wherein the first encoding mode indicates that the current block is identical to a second block that is encoded prior to the current block, the current block adjacent to the second block in a slice of the image.

According to another exemplary embodiment, there is provided an apparatus for encoding mode information of a current block of an image, the apparatus including: a run determination unit that determines whether an encoding mode of a current block is identical to an encoding mode of a plurality of consecutive previous blocks; a run encoder that, in response to the run determination unit determining that the encoding mode of the current block is identical to the encoding mode of the plurality of consecutive previous blocks, encodes information about a run length of the identical encoding mode; an information encoder that, in response to the run determination unit determining that the encoding mode of the current block is not identical to the encoding mode of the plurality of consecutive previous blocks, encoding at least one of first information indicating that the current block is encoded in a first encoding mode and second information indicating that the encoding mode of the current block is one of a second encoding mode and a third encoding mode, wherein the first encoding mode indicates that the current block is identical to a second block that is encoded prior to the first block, the current block adjacent to the second block in a slice of the image.

According to additional exemplary embodiments, there is provided a computer-readable recording medium having respectively embodied thereon a program for executing the encoding and decoding methods.

BRIEF DESCRIPTION OF THE DRAWINGS

The above and other features and advantages will become more apparent by describing in detail exemplary embodiments thereof with reference to the attached drawings in which.

DETAILED DESCRIPTION

The exemplary embodiments will now be described more fully with reference to the accompanying drawings, in which exemplary embodiments of the invention are shown.

Figure 1:
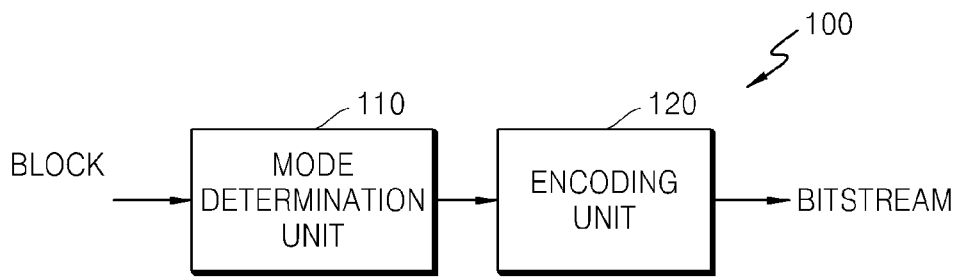
FIG. 1 is a block diagram of an apparatus for encoding an image, according to an exemplary embodiment.

FIG. 1 is a block diagram of an apparatus 100 for encoding an image, according to an exemplary embodiment.

Referring to FIG. 1, the apparatus 100 includes a mode determination unit 110, an encoding unit 120.

The mode determination unit 110 determines an encoding mode used to encode a current block. Devices are interconnected in a wireless network to transmit and receive high quality content above a high definition (HD) level. A standard for allowing interconnection between various devices is now being established with a focus on a small memory and low complexity. Accordingly, since image encoding also requires low complexity, complex methods, such as MPEG-1, MPEG-2, and MPEG-4H.264/MPEG-4 advanced video coding (AVC) methods, for increasing a compression ratio are not used.

However, if an image is transmitted without compressing pixel values of the image, a wireless network having a high transmission rate is required, and thus interconnection between various devices may also be interrupted. Accordingly, if an image is encoded and decoded by using three modes, such as a skip mode, a natural mode, and a graphic mode to be described below, low complexity and an appropriate level of compression ratio may be ensured.

The skip mode is a mode for encoding a current block based on whether the current block is identical or similar to a neighboring block of the current block. The natural mode is a mode for encoding a current block by performing discrete cosine transformation (DCT) and bit plane splitting if the current block is a block of a natural image. The graphic mode is a mode for encoding a current block by performing bit plane splitting if the current block is a block of an artificial image, such as a text image. The skip mode, the natural mode, and the graphic mode will be described in detail with reference to FIGS. 3 through 5.

The mode determination unit 110 determines one of the above-mentioned modes to be used to encode the current block. Initially, the mode determination unit 110 determines whether the current block is identical or similar to a neighboring block, which is encoded prior to the current block in a current slice, by comparing pixel values of the current block with pixel values of the neighboring block. An operation of the mode determination unit 110 will be described in detail with reference to FIGS. 2 and 3.

Figure 2:
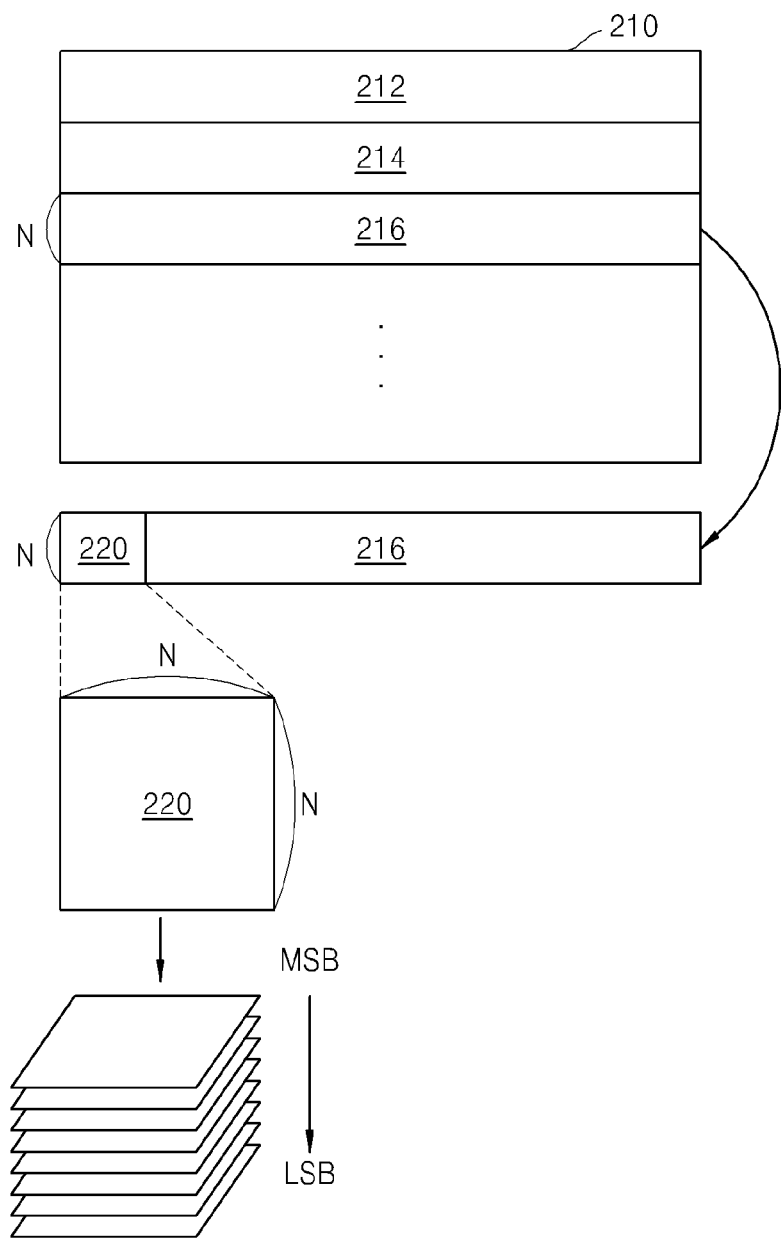
FIG. 2 is a diagram illustrating an image encoding unit according to an exemplary embodiment.

FIG. 2 is a diagram illustrating an image encoding unit according to an exemplary embodiment.

Referring to FIG. 2, the apparatus 100 encodes an image by splitting the image in units of slices, blocks, and bit planes. The apparatus 100 splits a current picture 210 into a plurality of slices 212, 214, and 216, each slice having N rows of pixels. The image encoding apparatus 100 splits each of the slices 212, 214, and 216 into N×N blocks 220, and then splits each of the N×N blocks into a plurality of bit planes from a bit plane of most significant bits (MSBs) to a bit plane of least significant bits (LSBs). If pixel values or DCT coefficients of a block 220 are represented by M bits, the block 220 may be split into M bit planes.

Figure 3:
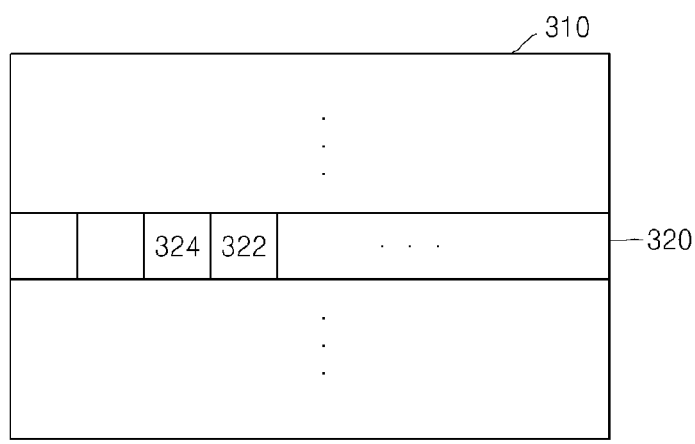
FIG. 3 is a diagram for explaining a method of determining a skip mode, according to an exemplary embodiment.

FIG. 3 is a diagram for explaining a method of determining a skip mode, according to an exemplary embodiment.

Referring to FIG. 3, as described with reference to FIG. 2, a current picture 310 may be split into a plurality of slices. The following explanation will be made on the assumption that the apparatus 100 encodes a slice 320.

In order to encode a current block 322 of the current slice 320, the mode determination unit 110 of the apparatus 100 determines whether the current block 322 is identical or similar to a neighboring block 324 that is encoded prior to the current block 322. In general, a current block that is spatially adjacent to a neighboring block is likely to be identical or similar to the neighboring block. Accordingly, if the current block 322 is identical or similar to the neighboring block 324 (illustrated as on the left of the current block 322 in FIG. 3), the mode determination unit 110 may determine an encoding mode of the current block 322 to be the skip mode. The neighboring block 324 may be a block that is encoded immediately prior to the current block 322.

Whether the current block 322 and the neighboring block 324 are identical or similar to each other may be determined by using various methods. A cost is calculated based on a sum of absolute difference (SAD), a mean square error (MSE), a signal to noise ratio (SNR), or a maximum difference between the current block 322 and the neighboring block 324, and whether the current block 322 and the neighboring block 324 are identical or similar to each other is determined according to the calculated cost. If the SAD, the MSE, or the maximum difference has or is close to a value '0', it may be determined that the current block 322 and the neighboring block 324 are identical or sufficiently similar to each other.

The encoding mode of the current block 322 may be determined as the skip mode only when the mode determination unit 110 determines that the current block 322 and the neighboring block 324 are completely identical to each other, or when the mode determination unit 110 determines that the current block 322 and the neighboring block 325 are sufficiently similar to each other. In other words, when the SAD, the MSE, or the maximum difference has a value '0', or when the SAD, the MSE, or the maximum difference is equal to or less than a predetermined threshold value, it is determined that the current block 322 and the neighboring block 324 are similar to each other. Accordingly, the encoding mode of the current block 322 may be determined to be the skip mode.

If the mode determination unit 110 determines that the encoding mode of the current block is not the skip mode, the mode determination unit 110 determines the encoding mode of the current block 322 to be one of a natural mode and a graphic mode. If it is determined that the current block is a block of a natural image, that is, a non-artificial image, the mode determination unit 110 determines the encoding mode of the current block to be the natural mode. If it is determined that the current block is a block of an artificial image, such as a text image or a computer graphic image, the mode determination unit 110 determines the encoding mode of the current block to be the graphic mode.

The method of determining whether the current block 322 is a block of a natural image or a block of an artificial image is not restrictive and any of various algorithms may be used. For example, since identical pixel values are likely to be distributed in a certain region of an artificial image, if pixel values of the current block 322 are compared. If the number of identical pixel values is equal to or greater than a predetermined number, it may be determined that the current block is a block of an artificial image.

Alternatively, the current block 322 may be encoded in the natural mode and the graphic mode, and then the natural mode or the graphic mode may be determined as the encoding mode of the current block 322 based on rate distortion (RD) costs of the encoded blocks. The method using the RD costs will be described with reference to FIG. 7.

Referring back to FIG. 1, if the encoding mode of the current block is determined by the mode determination unit 110, the encoding unit 120 encodes the current block in the encoding mode determined by the mode determination unit 110.

If the current block is identical or similar to the neighboring block, and thus the encoding mode of the current block is determined to be the skip mode, the encoding unit 120 encodes information, e.g., flag information, indicating that the current block is encoded in the skip mode, instead of encoding the pixel values of the current block.

Since flag information of one bit may be encoded, instead of encoding all of the pixel values of the current block, an image compression ratio is improved. Also, since only the neighboring block encoded immediately prior to the current block is referred, in order to encode the current block in the skip mode, the skip mode requires low complexity.

If it is determined that the current block is not identical or similar to the neighboring block, and thus the encoding mode of the current block is not the skip mode, the encoding unit 120 encodes the current block in the natural mode or the graphic mode. If the mode determination unit 110 determines the encoding mode of the current block to be the natural mode, the encoding unit 120 encodes the current block in the natural mode. If the mode determination unit 110 determines the encoding mode of the current block as the graphic mode, the encoding unit 120 encodes the current block in the graphic mode. The encoding methods in the natural mode and the graphic mode will be explained in detail with reference to FIGS. 4, 5, 6A, and 6B.

Figure 4:
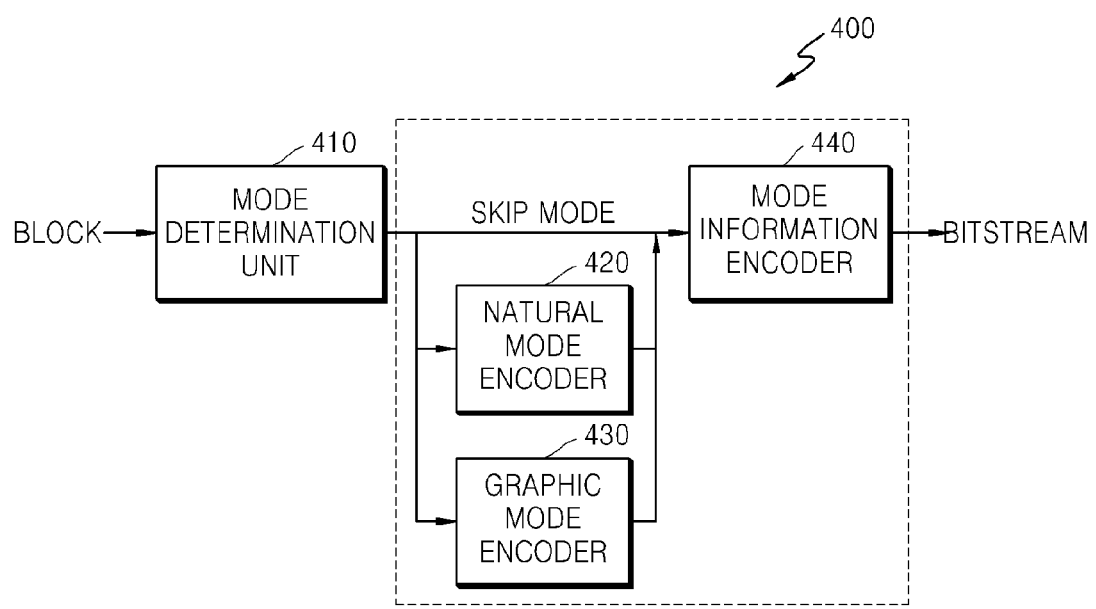
FIG. 4 is a block diagram of an apparatus for encoding an image, according to another exemplary embodiment.

FIG. 4 is a block diagram of an apparatus 400 for encoding an image, according to another exemplary embodiment.

Referring to FIG. 4, the apparatus 400 includes a mode determination unit 410, a natural mode encoder 420, a graphic mode encoder 430, and a mode information encoder 440. The mode determination unit 410 corresponds to the mode determination unit 110 of FIG. 1, and the natural mode encoder 420, the graphic mode encoder 430, and the mode information encoder 440 correspond to the encoding unit 120 of FIG. 1.

The mode determination unit 410 may determine an encoding mode of a current block. The mode determination unit 410 may determine an encoding mode of the current block, from among a skip mode, a natural mode, and a graphic mode.

If the mode determination unit 410 determines the encoding mode of the current block to be the skip mode, the mode information encoder 440 encodes information, e.g., flag information, indicating that the current block is encoded in the skip mode, instead of encoding pixel values of the current block.

If the mode determination unit 410 determines the encoding mode of the current block to be the natural mode, the natural mode encoder 420 encodes the current block in the natural mode by performing DCT on the current block to generate DCT coefficients, separating the DCT coefficients into a plurality of bit planes, and encoding each of the bit planes by using a bit plane-based encoding method, which will be explained in detail with reference to FIG. 5.

Figure 5:
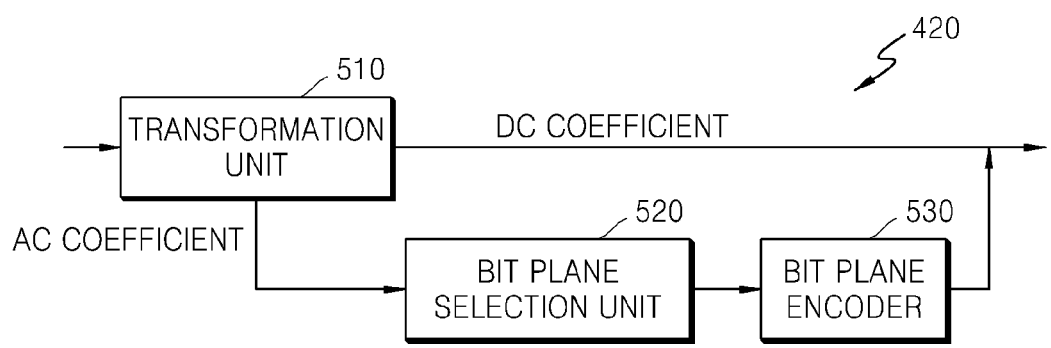
FIG. 5 is a block diagram of a natural mode encoder of the apparatus of FIG. 4, according to an exemplary embodiment.

FIG. 5 is a block diagram of the natural mode encoder 420 of the apparatus 400 of FIG. 4.

Referring to FIG. 5, the natural mode encoder 420 includes a transformation unit 510, a bit plane selection unit 520, and a bit plane encoder 530.

The transformation unit 510 performs DCT on the current block to generate DCT coefficients. DCT is only an exemplary method of transforming pixel values of a pixel domain to a frequency domain and generating frequency domain coefficients, and it will be easily understood by one of ordinary skill in the art that the current block may be transformed in using other methods.

From among the DCT coefficients generated when the transformation unit 510 performs DCT on the current block, bitstreams of direct current (DC) coefficients are constantly maintained. However, alternating current (AC) coefficients are encoded by using a bit plane-based encoding method.

The bit plane selection unit 520 divides the coefficients of the AC coefficients into a plurality of bit planes from a bit plane of MSBs to a bit plane of LSBs. M-bit AC coefficients are divided in units of bits to generate M bit planes. A first bit plane of the MSBs in bitstreams of the AC coefficients is generated, and a second bit plane of second MSBs in the bitstreams is generated. This operation is repeated to the LSBs to generate the M bit planes.

Once the bit plane selection unit 520 generates the bit planes, the bit plane encoder 530 encodes each of the bit planes by using a bit p lane-based encoding method. A method of encoding the bit planes is not limited, and any conventional bit plane-based encoding method may be used. Also, in FIG. 4, each of the bit planes may be encoded by using a bit mask. A region having significant bits may be set in each of the bit planes by using the bit mask, and bit plane-based encoding may be performed on only the set region.

The method of separately encoding the DC coefficients and the AC coefficients has been explained with reference to FIG. 5. However, the present exemplary embodiment is not limited thereto, and the natural mode encoder 420 may use other methods of encoding the current block by performing DCT and by using a bit plane-based encoding method.

Referring back to FIG. 4, if the mode determination unit 410 determines the encoding mode of the current block to be the graphic mode, the graphic mode encoder 430 encodes the current block in the graphic mode by dividing the pixel values of the current block into a plurality of bit planes and encoding each of the bit planes by using a bit plane-based encoding method, which will be explained in detail with reference to FIG. 6A.

Figure 6A:
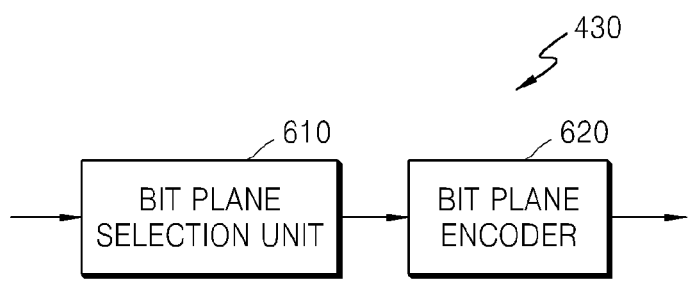
FIG. 6A is a block diagram of a graphic mode encoder of the apparatus of FIG. 4, according to an exemplary embodiment.

FIG. 6A is a block diagram of the graphic mode encoder 430 of the apparatus 400 of FIG. 4.

Referring to FIG. 6A, the graphic mode encoder 430 includes a bit plane selection unit 610 and a bit plane encoder 620.

The bit plane selection unit 610 divides pixel values of a current block into a plurality of bit planes. P-bit pixel values are divided in units of bits from a bit plane of MSBs to a bit plane of LSBs to generate P bit planes.

Once the bit plane selection unit 610 generates the plurality of bit planes, the bit plane encoder 620 encodes each of the plurality of bit planes by using a bit plane-based encoding method.

Figure 6B:
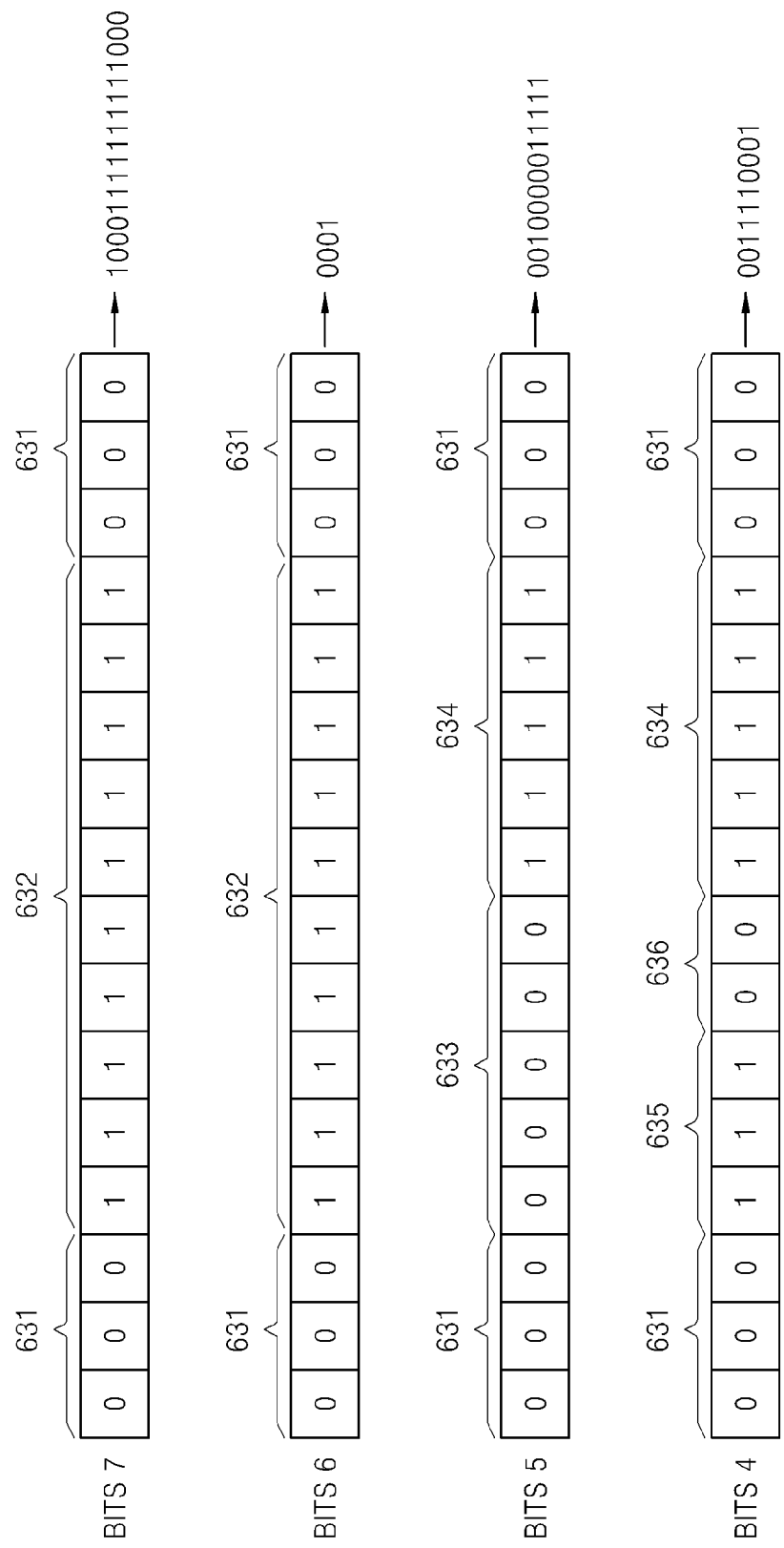
FIG. 6B is a diagram illustrating a bit plane-based encoding method according to an exemplary embodiment.

FIG. 6B is a diagram illustrating a bit plane-based encoding method according to an exemplary embodiment.

Referring to FIG. 6B, the bit plane encoder 620 encodes a bit plane by grouping identical bit values. If it is assumed that a current block has a size of 4×4 and 8-bit pixel values, the bit plane encoder 620 encodes a bit plane of bits 7 that are MSBs, as shown in FIG. 6B. The bit plane of bits 7 is encoded by dividing a group 631, having a value '0', from a group 632, having a value '1'. Since the bit plane of bits 7 is divided into the groups 631 and 632 according to a bit value, a value '1' is initially encoded, and then a value '0001111111111000', representing individual bits of the groups 631 and 632, is encoded.

A bit plane of bits 6 is encoded based on whether each of the groups 631 and 632 in the bit plane of bits 7 is split into groups having different bit values. In FIG. 6B, since both the group 631, having a value '0', and the group 632, having a value '1', are not split, a value '00', indicating that the group 631 having a value '0' is not split and a value '01, indicating that the group 632 having a value '1' is not split, are encoded.

In a bit plane of bits 5, the group 632, having a value '1' in the bit plane of bits 6, is split into two groups 633 and 634. Accordingly, a value '00', indicating that the group 631 having a value '0' is not split, is initially encoded. Then, a value '1', indicating that the group 632 having a value '1' is split, is encoded. Next, a value '0000011111', indicating individual bits of the groups 634 and 644 split from the group 632 having a value '1', is encoded.

In a bit plane of bits 4, the group 633 having a value '0', which is split from the group 632 having a value '1', is split into two groups 635 and 636. Accordingly, a value '00', indicating that the group 631 having a value '0' is not split, is initially encoded. Also, a value '1', indicating that the group 633 having a value '0', which is split from the group 632 having a value '1' is split, is encoded, and a value '11100', indicating individual bits of the groups 635 and 636 split from the group 633, is encoded. Next, a value '01', indicating that the group 634 having a value '1' is not split, is encoded.

The bit plane encoder 620 encodes every bit plane to a bit plane of LSBs by repeatedly performing a bit plane-based encoding method based on bit groups generated by grouping identical bit values, as described above.

Referring back to FIG. 4, the mode information encoder 440 encodes information about the encoding mode of the current block. If the mode determination unit 410 determines the encoding mode of the current block to be the skip mode, the mode information encoder 440 encodes information, e.g., flag information, indicating that the current block is encoded, in the skip mode.

If the mode determination unit 410 determines the encoding mode of the current block to be the natural mode or the graphic mode, as in the skip mode, the mode information encoder 440 may encode information, e.g., flag information, indicating that the current block is encoded in the natural mode or information indicating that the current block is encoded in the natural mode or the graphic mode.

Also, the mode information encoder 440 may encode information, e.g., flag information, indicating whether a current slice, which includes the current block, includes blocks that are encoded in the skip mode, the natural mode, or the graphic mode. The flag information about the current slice may be a syntax element of the current slice.

Figure 7:
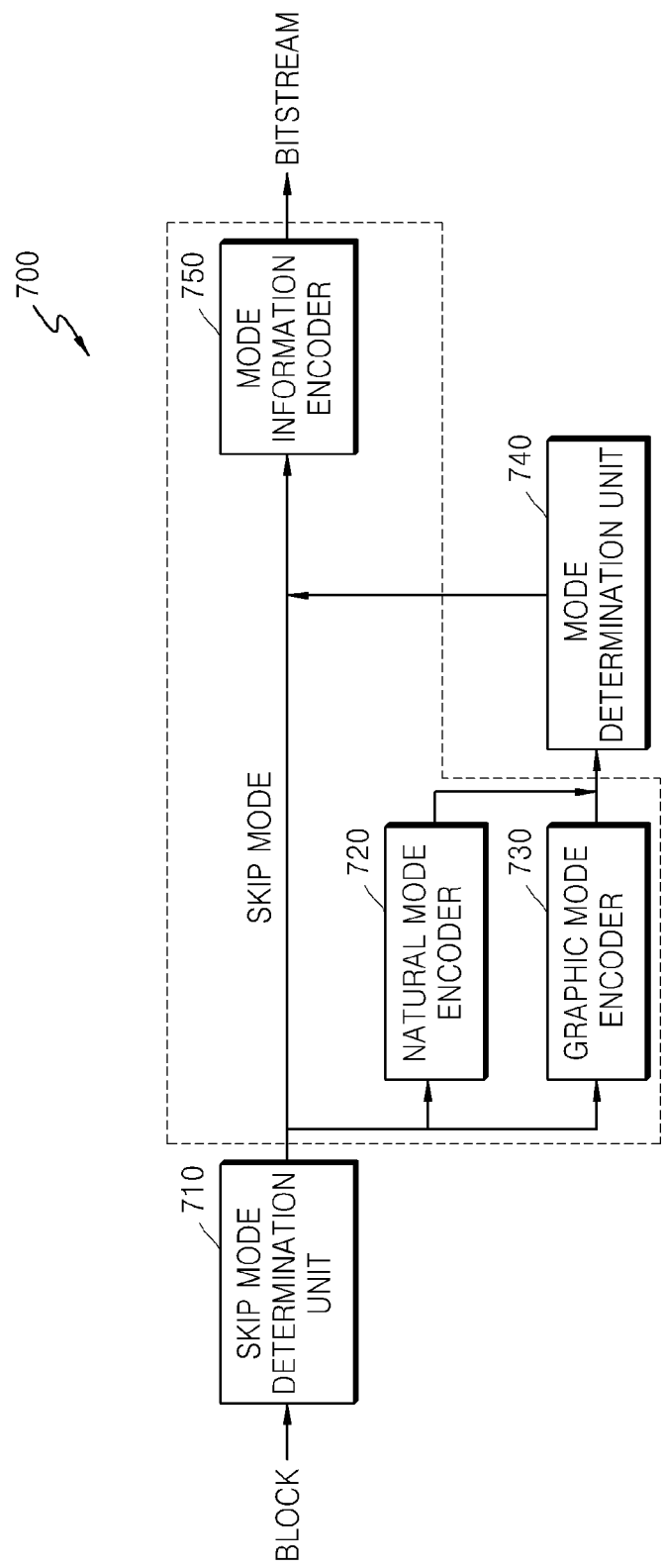
FIG. 7 is a block diagram of an apparatus for encoding an image, according to another exemplary embodiment.

FIG. 7 is a block diagram of an apparatus 700 for encoding an image, according to another exemplary embodiment.

Referring to FIG. 7, the apparatus 700 includes a skip mode determination unit 710, a natural mode encoder 720, a graphic mode encoder 730, a mode determination unit 740, and a mode information encoder 750.

The skip mode determination unit 710 and the mode determination unit 740 correspond to the mode determination unit 110 of FIG. 1, and the natural mode encoder 720, the graphic mode encoder 730, and the mode information encoder 750 correspond to the encoding unit 120 of FIG. 1.

The skip mode determination unit 710 determines whether a current block is to be encoded in a skip mode. The skip mode determination unit 710 compares pixel values of the current block with pixel values of a neighboring block that is encoded prior to the current block, and determines the encoding mode of the current block to be the skip mode if the current block is identical or similar to the neighboring block.

If the skip mode determination unit 710 determines the encoding mode of the current block to be the skip mode, the mode information encoder 750 encodes information, e.g., flag information, indicating that the current block is encoded in the skip mode.

If the skip mode determination unit 71 determines that the encoding mode of the current block is not the skip mode, the natural mode encoder 720 and the graphic mode encoder 730 encode the current block in a natural mode and a graphic mode, respectively.

The mode determination unit 740 compares the blocks encoded by the natural mode encoder 720 and the graphic mode encoder 730 and determines whether the current block is to be encoded in the natural mode or the graphic mode.

The mode determination unit 740 calculates RD costs based on a result of encoding the current block in the natural mode and a result of encoding the current block in the graphic mode, according to the equation cost=(rate)+(lambda)×(distortion), and determines one of the natural mode and the graphic mode, which has a lower cost, as the encoding mode of the current block. A value of 'lambda' may be variably set according to an exemplary embodiment, and a reference value for selecting the natural mode or the graphic mode may be changed by adjusting the value of 'lambda'.

If the mode determination unit 740 determines the encoding mode of the current block to be the natural mode or the graphic mode, the mode information encoder 750 encodes information, e.g., flag information, indicating that the current block is encoded in the natural mode or the graphic mode.

Also, as described above with reference to FIG. 6, further to the encoding of the information about the encoding mode of the current block, the mode information encoder 750 may encode information indicating whether a current slice includes blocks that are encoded in the skip mode, the natural mode, or the graphic mode.

Figure 8:
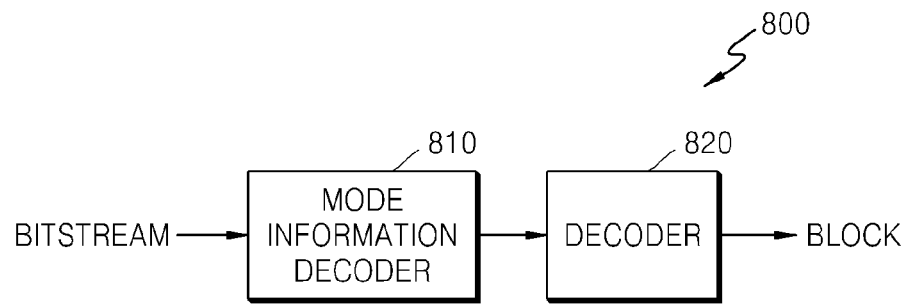
FIG. 8 is a block diagram of an apparatus for decoding an image, according to an exemplary embodiment.

FIG. 8 is a block diagram of an apparatus 800 for decoding an image, according to an exemplary embodiment.

Referring to FIG. 8, the apparatus 800 includes a mode information decoder 810 and a decoder 820.

The mode information decoder 810 decodes information that indicates an encoding mode of a current block included in a bitstream. The mode information decoder 810 decodes information that indicates whether the current block is encoded in a skip mode, a natural mode, or a graphic mode, by parsing the bitstream.

The decoder 820 decodes the current block based on the information decoded by the mode information decoder 810. If the decoded information indicates that the current block is encoded in the skip mode, the decoder 820 restores the current block based on a block that is identical or similar to the current block, i.e., a neighboring block that is decoded prior to the current block. The neighboring block may be a block that is decoded immediately prior to the current block. If the decoded information indicates that the current block is encoded in the natural mode or the graphic mode, the decoder 820 restores the current block by inversely performing the encoding operations described above with reference to FIGS. 5 and 6A, which will be explained in detail with reference to FIG. 9.

Figure 9:
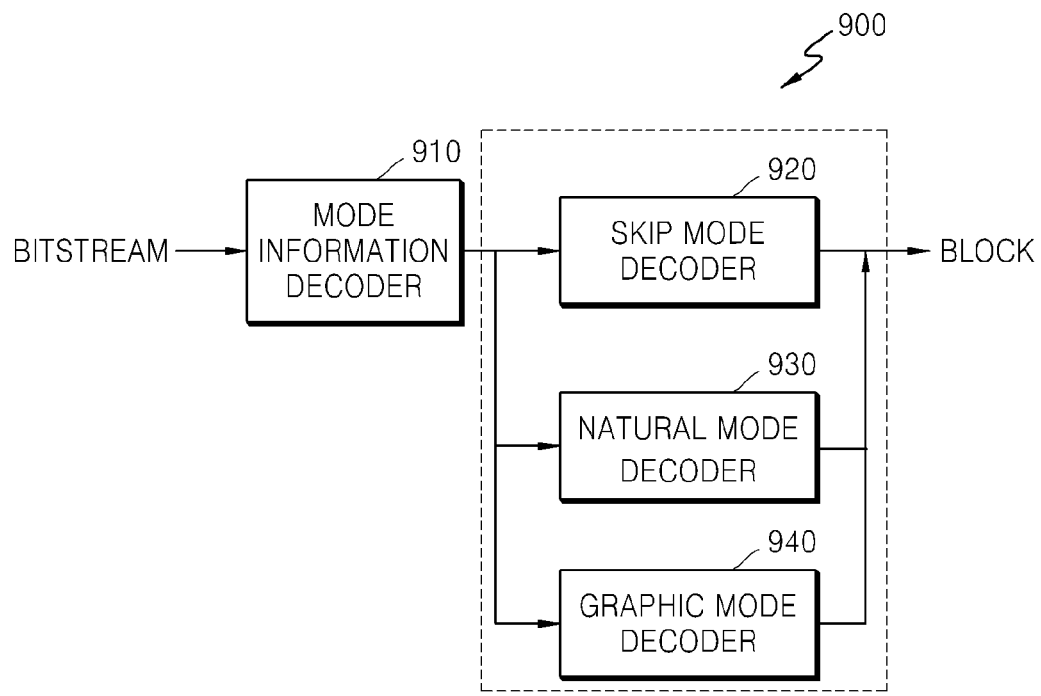
FIG. 9 is a block diagram of an apparatus for decoding an image, according to another exemplary embodiment.

FIG. 9 is a block diagram of an apparatus 900 for decoding an image, according to another exemplary embodiment.

Referring to FIG. 9, the apparatus 900 includes a mode information decoder 910, a skip mode decoder 920, a natural mode decoder 930, and a graphic mode decoder 940. The mode information decoder 910 corresponds to the mode information decoder 810 of FIG. 8, and the skip mode decoder 920, the natural mode decoder 930, and the graphic mode decoder 940 correspond to the decoder 820 of FIG. 8.

Like the mode information decoder 810 of FIG. 8, the mode information decoder 910 decodes information that indicates an encoding mode of a current block included in a bitstream.

The skip mode decoder 920 decodes the current block in a skip mode, if the decoded mode information is indicates that the current block is encoded in the skip mode. The skip mode decoder 920 restores the current block based on a neighboring block that is decoded prior to the current block. In this case, the current block may be restored by copying the neighboring block.

The natural mode decoder 930 decodes the current block in a natural mode, if the decoded mode information indicates that the current block is encoded in the natural mode. The natural mode decoder 930 initially parses DC coefficients from among DCT coefficients included in the bitstream. Next, the natural mode decoder 930 restores a plurality of bit planes of AC coefficients from among the DCT coefficients, by using a bit plane-based decoding method. If the AC coefficients are restored by combining the restored bit planes, inverse DCT (IDCT) is performed based on the restored AC coefficients and the parsed DC coefficients. The current block is restored, as such.

The graphic mode decoder 940 decodes the current block in a graphic mode, if the decoded mode information indicates that the current block is encoded in the graphic mode. The graphic mode decoder 940 restores a plurality of bit planes of pixel values of the current block by using a bit plane-based decoding method. Next, the pixel values of the current block are restored by combining the restored bit planes.

Figure 10:
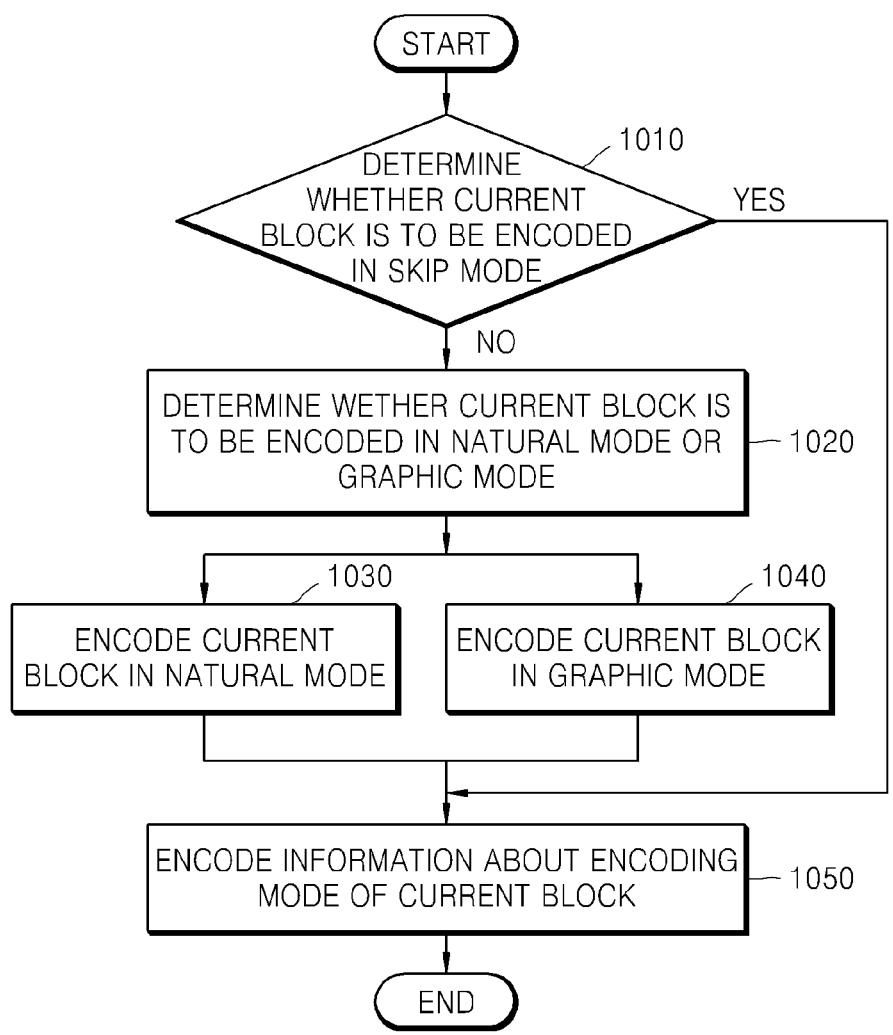
FIG. 10 is a flowchart illustrating a method of encoding an image, according to an exemplary embodiment.

FIG. 10 is a flowchart illustrating a method of encoding an image, according to an exemplary embodiment.

Referring to FIG. 10, in operation 1010, the apparatus 100 or 400 of FIG. 1 or 4 determines whether a current block is to be encoded in a skip mode. The skip mode is a mode in which, if the current block and a neighboring block are identical or similar to each other, information indicating that the current block is encoded in the skip mode is encoded, instead of encoding pixel values of the current block.

If it is determined in operation 1010 that the encoding mode of the current block is not the skip mode, the method proceeds to operation 1020. In operation 1020, the apparatus 100 or 400 determines whether the current block is to be encoded in a natural mode or a graphic mode. As described above with reference to the mode determination unit 110 of FIG. 1, whether the current block is to be encoded in the natural mode or the graphic mode may be determined by determining whether the current block is a block of a natural image or a block of an artificial image.

In operation 1030, the apparatus 100 or 400 encodes the current block in the natural mode. If it is determined in operation 1020 that the current block is a block of a natural image, the current block is encoded in the natural mode. The method of encoding the current block in the natural mode has been described above with reference to FIG. 5.

In operation 1040, the apparatus 100 or 400 encodes the current block in the graphic mode. If it is determined in operation 1020 that the current block is a block for an artificial image, the current block is encoded in the graphic mode. The method of encoding the current block in the graphic mode has been described above with reference to FIG. 6A.

In operation 1050, the apparatus 100 or 400 encodes information about the encoding mode of the current block. If it is determined in operation 1010 that the encoding mode of the current block is the skip mode, the apparatus 100 or 400 encodes information indicating that the current block is encoded in the skip mode, instead of encoding the pixel values of the current block. Also, if it is determined in operation 1010 that the encoding mode of the current block is not the skip mode, and thus in operation 1030 or 1040, the current block is encoded in the natural mode or the graphic mode, the apparatus 100 or 400 encodes information indicating that the current block is encoded in the natural mode or the graphic mode.

Figure 11:
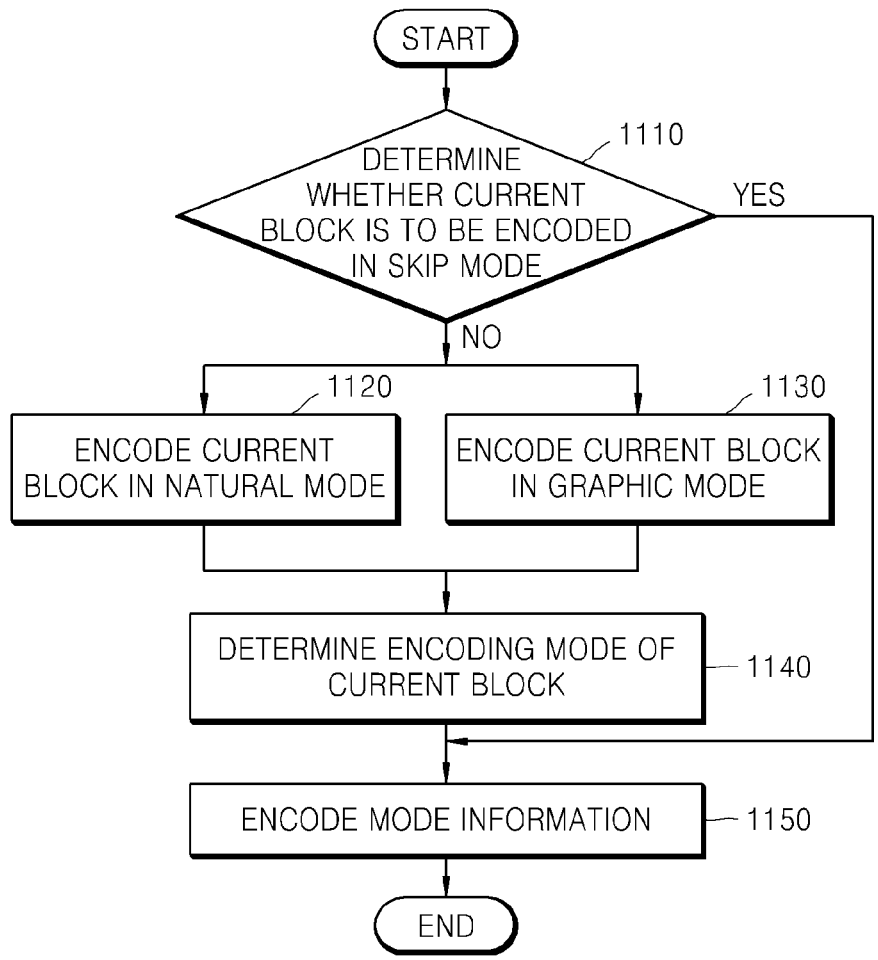
FIG. 11 is a flowchart illustrating a method of encoding an image, according to another exemplary embodiment.

FIG. 11 is a flowchart illustrating a method of encoding an image, according to another exemplary embodiment.

Referring to FIG. 11, in operation 1110, the apparatus 100 or 700 of FIG. 1 or 7 determines whether a current block is to be encoded in a skip mode. Operation 1110 corresponds to operation 1010 illustrated in FIG. 10.

If it is determined in operation 1110 that the encoding mode of the current block is not the skip mode, the method proceeds to operations 1120 and 1130. In operations 1120 and 1130, the apparatus 100 or 700 encodes the current block in a natural mode and a graphic mode, respectively.

In operation 1140, the apparatus 100 or 700 compares a result of the natural mode encoding with a result of the graphic mode encoding, and determines the encoding mode of the current block. The apparatus 100 or 700 calculates RD costs based on the results of the natural mode encoding and the graphic mode encoding, and determines one of the natural mode and the graphic mode, which has a lower cost, as the encoding mode of the current block.

In operation 1150, the apparatus 100 or 700 encodes information about the encoding mode of the current block. If it is determined in operation 1110 that the encoding mode of the current block is the skip mode, the apparatus 100 or 700 encodes information indicating that the current block is encoded in the skip mode, instead of encoding pixel values of the current block. Also, if it is determined in operation 1110 that the encoding mode of the current block is not the skip mode, and it is determined in operation 1140 that the encoding mode of the current block is the natural mode or the graphic mode, the apparatus 100 or 700 encodes information indicating that the current block is encoded in the natural mode or the graphic mode.

Figure 12:
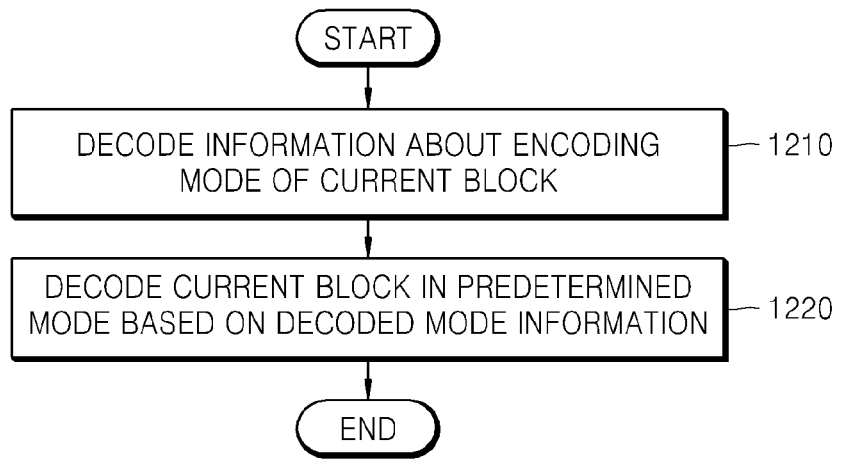
FIG. 12 is a flowchart illustrating a method of decoding an image, according to an exemplary embodiment.

FIG. 12 is a flowchart illustrating a method of decoding an image, according to an exemplary embodiment.

Referring to FIG. 12, in operation 1210, the apparatus 800 or 900 of FIG. 8 or 9 decodes information that indicates an encoding mode of a current block included in a bitstream. The apparatus 800 or 900 decodes information indicating that the current block is encoded in a skip mode, a natural mode, or a graphic mode by parsing the bitstream.

In operation 1220, the apparatus 800 or 900 decodes the current block based on the information decoded in operation 1210. If the decoded information indicates that the current block is encoded in the skip mode, the apparatus 800 or 900 restores the current block based on a block that is identical or similar to the current block, i.e., a neighboring block that is decoded prior to the current block. If the decoded information indicates that the current block is encoded in the natural mode or the graphic mode, the apparatus 800 or 900 restores the current block by inversely performing the encoding operations described above with reference to FIGS. 5 and 6A.

Figure 13:
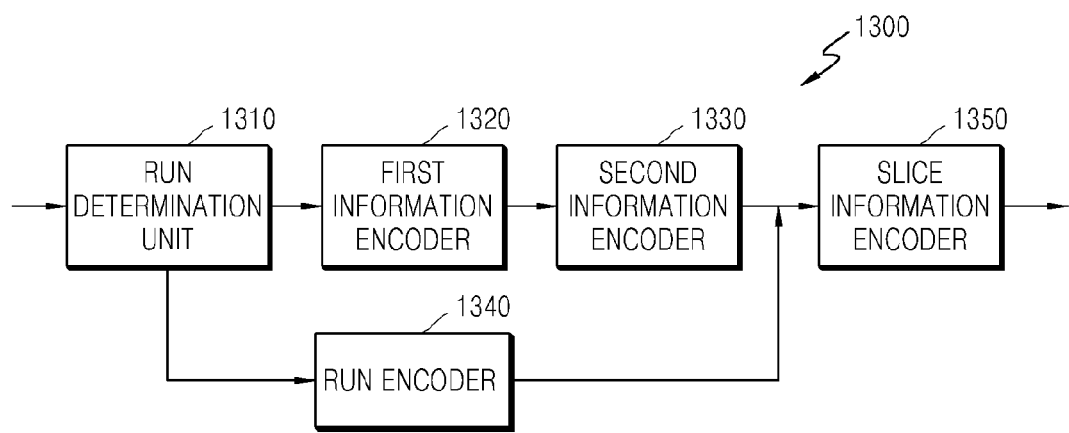
FIG. 13 is a block diagram of an apparatus for encoding mode information, according to an exemplary embodiment.

FIG. 13 is a block diagram of an apparatus 1300 for encoding mode information, according to an exemplary embodiment. The apparatus 1300 of FIG. 13 corresponds to the mode information encoder 440 of FIG. 4 and the mode information encoder 750 of FIG. 7.

Referring to FIG. 13, the apparatus 1300 includes a run determination unit 1310, a first information encoder 1320, a second information encoder 1330, a run encoder 1340, and a slice information encoder 1350.

The run determination unit 1310 determines whether a current block is encoded in an encoding mode identical to encoding modes of a plurality of consecutive previous blocks. An encoding mode, which is used to encode the current block, may be any one of a skip mode, a natural mode, and a graphic mode as described above.

A neighboring block is likely to have pixel values identical to those of the current block and the neighboring block is likely to have an encoding mode identical to that of the current block. In this case, a data compression ratio may be improved by encoding only information about a run length, which indicates a number of times an identical encoding mode is repeated, instead of encoding information about encoding modes of all blocks. Accordingly, the run determination unit 1310 determines whether the encoding mode of the current block is identical to encoding modes of a plurality of blocks that are decoded prior to the current block. In FIG. 13, it may be determined whether the encoding mode of the current block is identical to encoding modes of two consecutive blocks, which are encoded prior to the current block.

Since an encoding mode of a predetermined block is a skip mode, a natural mode, or a graphic mode, a repeated identical mode may be a skip mode, a natural mode, or a graphic mode. Accordingly, the run determination unit 1310 may determine whether the skip mode is repeated, whether the natural mode is repeated, and whether the graphic mode is repeated.

However, in FIG. 13, the run determination unit 1310 may determine only whether a specific mode is repeated. For example, since a probability that the skip mode, from among the skip mode, the natural mode, and the graphic mode, is repeatedly used to encode consecutive blocks is high, the run determination unit 1310 may determine only whether the skip mode is repeated.

Also, whether a combination of two modes is repeated may be determined. The combination of the two modes may be a combination of the skip mode and the graphic mode, a combination of the skip mode and the natural mode, or a combination of the natural mode and the graphic mode.

Figure 14:
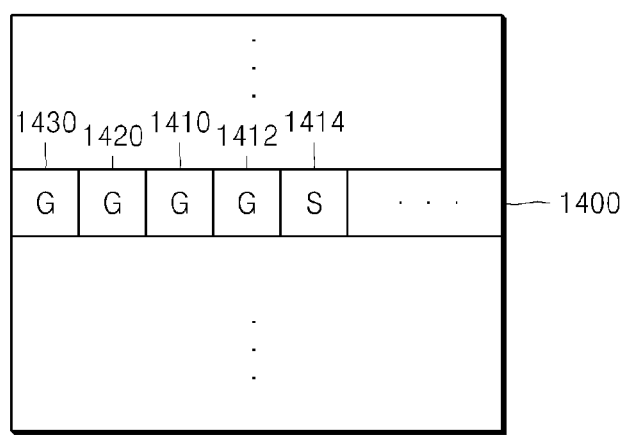
FIG. 14 is a diagram for explaining a case where an encoding mode is repeated, according to an exemplary embodiment.

FIG. 14 is a diagram for explaining a case where an encoding mode is repeated, according to an exemplary embodiment.

Referring to FIG. 14, when it is assumed that a third block of a current slice 1400 is a current block 1410, the current block 1410 is encoded in a mode identical to the encoding modes of a plurality of blocks 1420 and 1430, which are encoded prior to the current block 1410. Accordingly, the run determination unit 1310 may determine that an encoding mode of the current block 1410 is identical to encoding modes of the plurality of blocks 1420 and 1430, which are encoded prior to the current block 1410, and a run length is '1'. Once the run length is determined, the run encoder 1340 may encode only the run length '1', instead of encoding the encoding mode of the current block 1410.

However, since a fourth block 1412 is encoded in a mode identical to that of the current block 1410, as shown in FIG. 14, a run length for the current block 1410 is not encoded. In order to know how many times an identical encoding mode is repeated, encoding modes of blocks after the current block 1410 should be determined. Accordingly, when information about the encoding mode of the current block 1410 is encoded, the run determination unit 1410 only increases the run length by '1' and the run encoder 1340 does not encode the run length directly.

Since the fourth block 1412 of the current slice 1400 is also encoded in the graphic mode, the run determination unit 1410 increases the run length by '1' and the run length becomes '2'. However, since an encoding mode of a fifth block 1414 is a skip mode that is different from the encoding modes of its previous blocks, the run length may not be encoded instead of the encoding mode of the fifth block 1414.

Accordingly, the run determination unit 1340 encodes the run length '2' for the first block 1430 to the fourth block 1412, and at least one of first information and second information are encoded to indicate that the encoding mode of the fifth block 1414 is the skip mode, as will be described later.

The first information encoder 1320 encodes the first information, e.g., flag information, indicating that the current block is encoded in the skip mode. For example, if the mode determination units 110, 410, and 740 and the skip mode determination unit 710 determine that the current block is encoded in the skip mode, the flag information may be set to '1'. If it is determined that the current block is not encoded in the skip mode, the flag information may be set to '0.

Alternatively, the first information encoder 1320 may selectively encode the first information based on whether the current slice includes a block that is encoded in the skip mode. If the current slice does not include the block that is encoded in the skip mode, information about the skip mode for all blocks of the current slice is the same. In other words, the flag information about the skip mode is '0' for all of the blocks of the current slice. Accordingly, if the current slice does not include a block that is encoded in the skip mode, the first information does not need to be encoded for each of the blocks. In other words, the first information encoder 1320 encodes the first information about each of the blocks only when the current slice includes a block that is encoded in the skip mode.

Also, alternatively, even when the current slice includes a block that is encoded in the skip mode, if the current slice does not include a block that is encoded in a natural mode or a graphic mode, it is obvious that the current block is encoded in the skip mode. Accordingly, even when the current slice includes a block that is encoded in the skip mode, the first information may be encoded only when the current slice includes a block that is encoded in the natural mode or the graphic mode.

If it is determined that the current block is not encoded in the skip mode, the second information encoder 1330 encodes the second information that indicates one of the natural mode and the graphic mode is used to encode the current block. The second information may be flag information for specifying an encoding mode of the current block from among the natural mode and the graphic mode.

For example, if the current block is encoded in the natural mode, the flag information may be set to '0'. If the current block is encoded in the graphic mode, the flag information may be set to '1'. If the current block is encoded in the skip mode, since the first information encoder 1310 already encodes information about the skip mode, the second information encoder 1320 does not need to encode information about the natural mode and the graphic mode.

Since information indicating that the current block is encoded in a second mode (e.g., the natural mode) or a third mode (e.g., the graphic mode) is selectively encoded according to whether the current block is encoded in the skip mode, the number of bits necessary to encode information about a mode may be reduced.

For example, if the current block is encoded in the skip mode, information indicating that the current block is encoded in the skip mode may be encoded with one bit '1', and if the current block is encoded in the natural mode, information indicating that the current block is encoded in the natural mode may be encoded with two bits '00'. Also, if the current block is encoded in the graphic mode, information indicating that the current block is encoded in the graphic mode may be encoded with two bits '01'. A first bit '0' in the information about the natural mode and the information about the graphic mode is the first information indicating that the current block is not encoded in the skip mode, and second bits '0' and '1' are the second information indicating which mode from among the natural mode and the graphic mode is used to encode the current block.

Also, the second encoding unit 1330 may selectively encode the second information according to whether the current slice includes both a block that is encoded in the natural mode and a block that is encoded in the graphic mode.

Only when the first encoding unit 132 determines that the encoding mode of the current block is not the skip mode, does the second encoding unit 1330 encode the second information. Hence, the encoding mode of the current block is the natural mode or the graphic mode.

However, if the current slice includes only a block that is encoded in the natural mode, the current block is obviously a block that is encoded in the natural mode. Accordingly, a decoder may know that the encoding mode of the current block is the natural mode even when the second information encoder 1330 does not encode the second information. Similarly, when the current slice includes only a block that is encoded in the graphic mode, a decoder may know that the current block is a block that is encoded in the graphic mode even when the second information encoder does not encode the second information.

However, if the current slice includes both a block that is encoded in the natural mode and a block that is encoded in the graphic mode, since a decoder may not know whether the current block is encoded in the natural mode or the graphic mode, the second information encoder 1330 encodes the second information for specifying an encoding mode of the current block from among the natural mode and the graphic mode.

The run encoder 1340 encodes information about a run length indicating the number of times an identical encoding mode is repeated. If encoding modes of a plurality of consecutive previous blocks are identical to an encoding mode of the current block, the run length is increased by '1'. If the identical encoding mode is continuously repeated, the run length is continuously increased by '1'. If the identical encoding mode is no longer repeated, and a block that is encoded in a different mode occurs, information about the run length is encoded.

Referring to FIG. 14, since the run length '2', instead of the encoding modes of the current block 1410 and the fourth block 1412, is encoded, the number of bits used to encode information about the encoding modes of the current block 1410 and the fourth block 1412 may be reduced. Since the encoding modes of the current block 1410 and the fourth block 1412 are the graphic modes, in order to encode the encoding modes of the current block 1410 and the fourth block 1412 by encoding the first information and the second information, 4 bits are necessary. However, if information about the run length '2', instead of the information about the encoding modes, is encoded, 2 bits may be necessary, thereby improving a compression ratio.

The slice information encoder 1350 encodes third information indicating that the current slice includes a block that is encoded in the skip mode, and fourth information, e.g., flag information, indicating that the current slice includes a block that is encoded in the natural mode and flag information, indicating that the current slice includes a block that is encoded in the graphic mode.

The first information encoder 1320 and the second information encoder 1330 may selectively encode the first information and the second information according to whether the current slice includes the block that is encoded in the skip mode, whether the current slice includes the block that is encoded in the natural mode, and whether the current slice includes the block that is encoded in the graphic mode. Accordingly, a decoding side may specify the encoding mode of the current block even when the slice information encoder 1350 does not encode the first information and the second information by encoding the third information and the fourth information.

Figure 15:
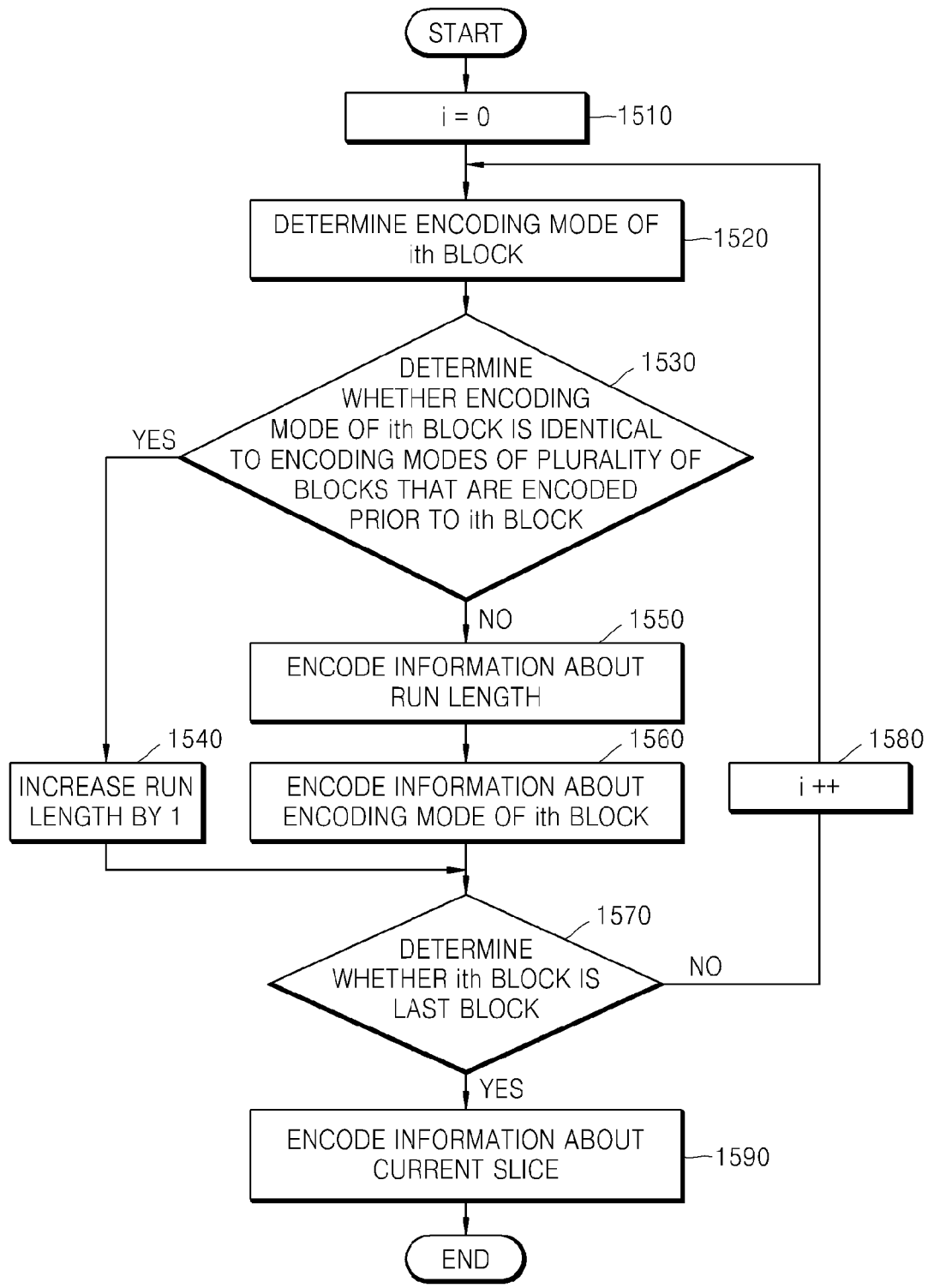
FIG. 15 is a flowchart illustrating a method of encoding mode information, according to an exemplary embodiment.

FIG. 15 is a flowchart illustrating a method of encoding mode information, according to an exemplary embodiment. FIG. 15 illustrates a method of encoding information about encoding modes of all blocks of a current slice.

In operation 1510, the apparatus 1300 sets an index 'i' indicating an order of a block to '0'.

In operation 1520, the apparatus 1300 determines an encoding mode of an $i^{th}$ block. The mode determination units 110, 410, and 740 and the skip mode determination unit 710 determine which mode from among a skip mode, a natural mode, and a graphic mode is used to encode the $i^{th}$ block.

In operation 1530, the apparatus 1300 determines whether the encoding mode of the $i^{th}$ block is identical to encoding modes of a plurality of consecutive previous blocks. For example, the apparatus 1300 may determine whether the encoding mode of the $i^{th}$ block is identical to encoding modes of two consecutive previous blocks.

When it is determined whether the encoding mode of the $i^{th}$ block is identical to the encode modes of the two consecutive previous blocks, in the case of 'i=0 or 1', that is, in the case of a first block or a second block of the current slice, since the number of consecutive blocks which are encoded prior to the first block or the second block is less than 2, it is impossible to determine whether the encoding blocks of the two consecutive previous blocks are identical. Accordingly, in this case, it is determined that the encoding mode of the $i^{th}$ block is not identical to the encoding modes of the consecutive previous blocks.

In operation 1540, the apparatus 1300 increases a run length by '1'. If it is determined in operation 1530 that the encoding mode of the $i^{th}$ block is identical to encoding modes of a plurality of blocks which are encoded prior to the $i^{th}$ block, the run length is increased by '1'. An initial value of the run length may be set to '0'.

In operation 1550, the apparatus 1300 encodes information about the run length. If it is determined in operation 1530 that the encoding mode of the $i^{th}$ block is not identical to the encoding modes of the consecutive previous blocks, information about the run length is encoded. Information about the run length for a first block to an $i-1^{th}$ block is encoded before information about the encoding mode of the $i^{th}$ block is encoded. At the same time as the information about the run length is encoded, the run length may be reset to the initial value '0'.

In operation 1560, the apparatus 1300 encodes the information about the encoding mode of the $i^{th}$ block. First information indicating that the current block is encoded in the skip mode and second information indicating which mode from among the natural mode and the graphic mode is used to encode the current block are encoded. Operation 1560 will be explained later in detail with reference to FIGS. 16 through 18.

In operation 1570, the apparatus 1300 determines whether the $i^{th}$ block is a last block. If it is determined in operation 1570 that the $i^{th}$ block is not the last block, the index 'i', indicating the order of the block, is increased by '1', in operation 1580, and operations 1520 through 1560 are repeated.

In operation 1590, the apparatus 1300 encodes information about the current slice. Third information, indicating that the current slice includes a block that is encoded in the skip mode, and fourth information, indicating that the current slice includes a block that is encoded in the natural mode and a block that is encoded in the graphic mode, are encoded.

Figure 16:
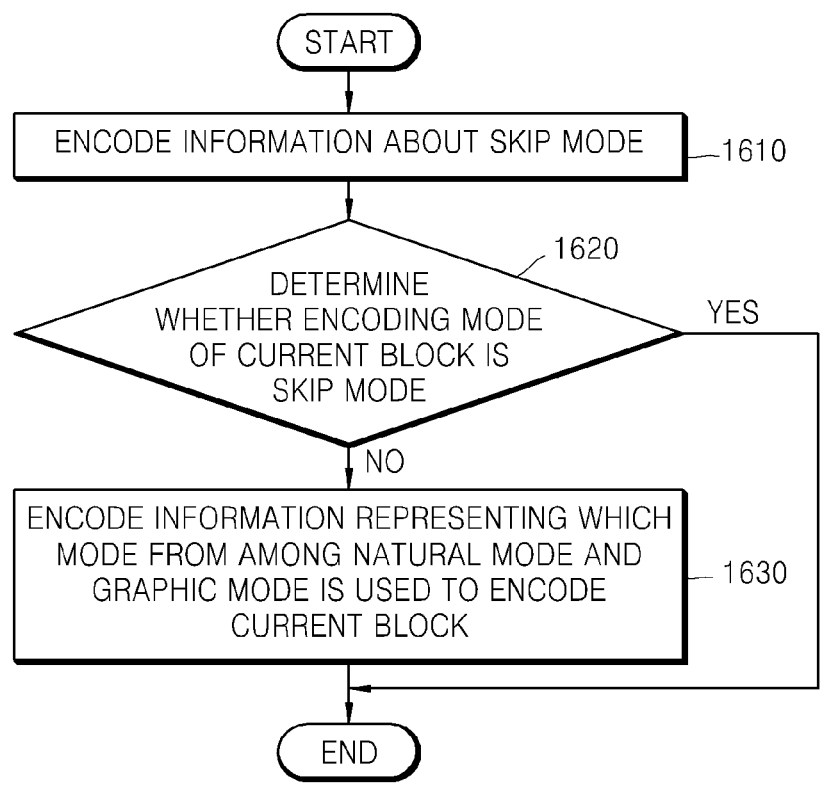
FIG. 16 is a detailed flowchart illustrating a method of encoding mode information, according to another exemplary embodiment.

FIG. 16 is a flowchart illustrating a method of encoding mode information, according to another exemplary embodiment.

FIG. 16 is a detailed flowchart illustrating operation 1560 of the method of FIG. 15. A method of encoding information about an encoding mode of the ith block that is the current block is illustrated in detail.

In operation 1610, the apparatus 1300 encodes information about the skip mode. The first information indicating that the current block is encoded in the skip mode is encoded. If the encoding mode of the current block is the skip mode, flag information may be set to '1', if the encoding mode of the current block is not the skip mode, the flag information may be set to '0'.

In operation 1620, the apparatus 1300 determines whether the encoding mode of the current block is the skip mode. If it is determined in operation 1620 that the encoding mode of the current block is not the skip mode, the method proceeds to operation 1630. In operation 1630, the second information indicating which mode from among the natural mode and the graphic mode is used to encode the current block is encoded. If the encoding mode of the current block is the natural mode, the flag information may be set to '0', and if the encoding mode of the current block is the graphic mode, the flag information may be set to '1'.

Figure 17:
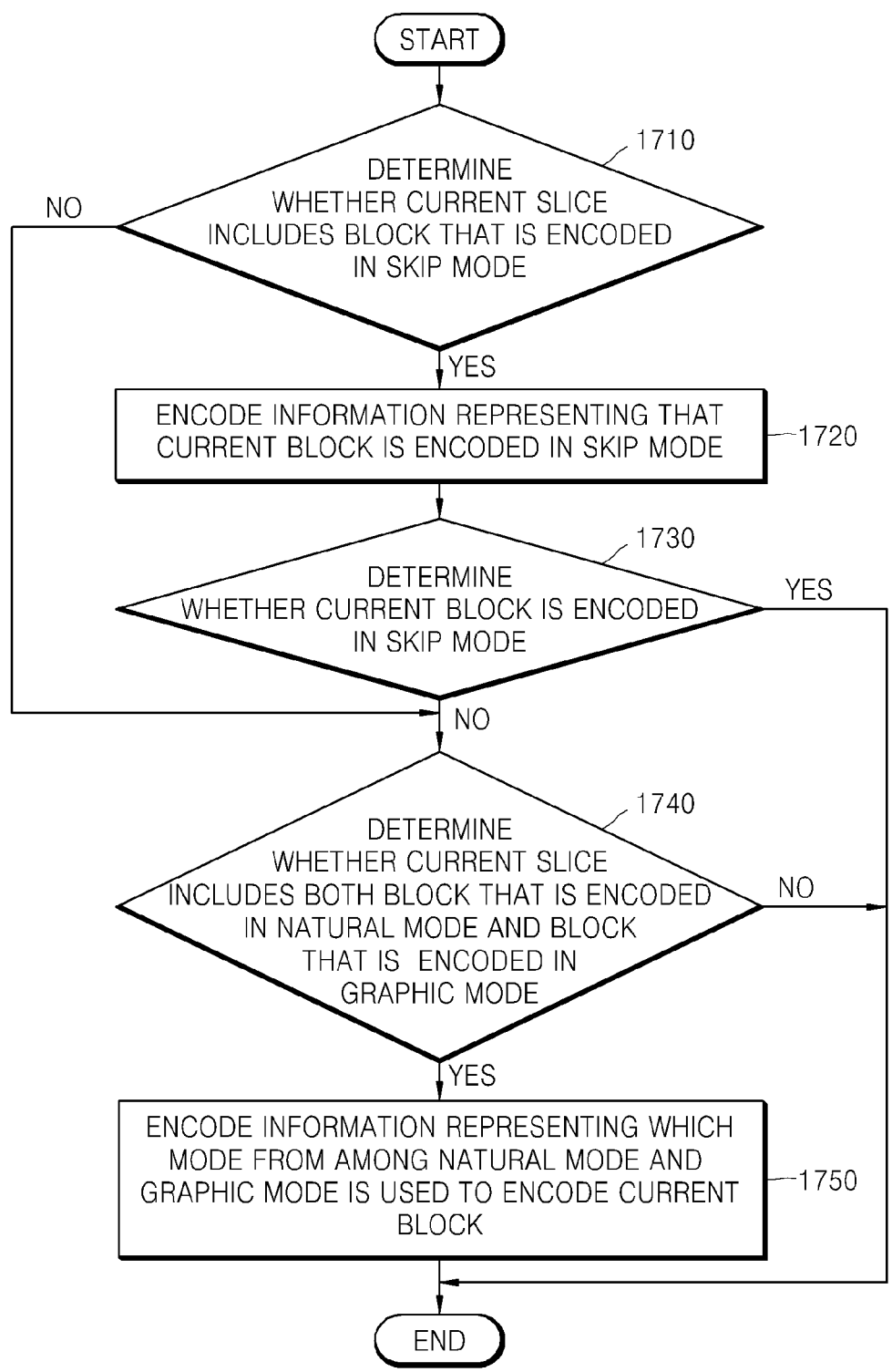
FIG. 17 is a flowchart illustrating a method of encoding mode information, according to another exemplary embodiment.

FIG. 17 is a flowchart illustrating a method of encoding mode information, according to another exemplary embodiment.

FIG. 17 is another detailed flowchart illustrating operation 1560 of the method of FIG. 15.

In operation 1710, the apparatus 1300 determines whether the current slice includes a block that is encoded in the skip mode. If it is determined in operation 1710 that the current slice does not include the block that is encoded in the skip mode, the first information indicating that the current block is encoded in the skip mode does not need to be encoded.

If it is determined in operation 1710 that the current slice includes the block that is encoded in the skip mode, the method proceeds to operation 1720. In operation 1720, the apparatus 1300 encodes the first information indicating that the current block is encoded in the skip mode. If the current block is encoded in the skip mode, the flag information may be set to '1', and if the current block is not encoded in the skip mode, the flag information may be set to '0'.

In operation 1730, the apparatus 1300 determines whether the current block is encoded in the skip mode. If it is determined in operation 1730 that the current block is encoded in the skip mode, information indicating that the current block is encoded in the natural mode or the graphic mode is not encoded.

In operation 1740, the apparatus 1300 determines whether the current slice includes both a block that is encoded in the natural mode and a block that is encoded in the graphic mode. If it is determined in operation 1740 that the current slice includes only the block that is encoded in the natural mode, since it is obvious that the current block is a block that is encoded in the natural mode, the second information indicating which mode from among the natural mode and the graphic mode is used to encode the current block does not need to be encoded. Also, if the current slice includes only the block that is encoded in the graphic mode, since it is also obvious that the current block is a block that is encoded in the graphic mode, the second information does not need to be encoded.

In operation 1750, the apparatus 1300 encodes the second information indicating which mode from among the natural mode and the graphic mode is used to encode the current block. If the current block is encoded in the natural mode, the flag information is set to '0', and if the current block is encoded in the graphic mode, the flag information is set to '1'.

Figure 18:
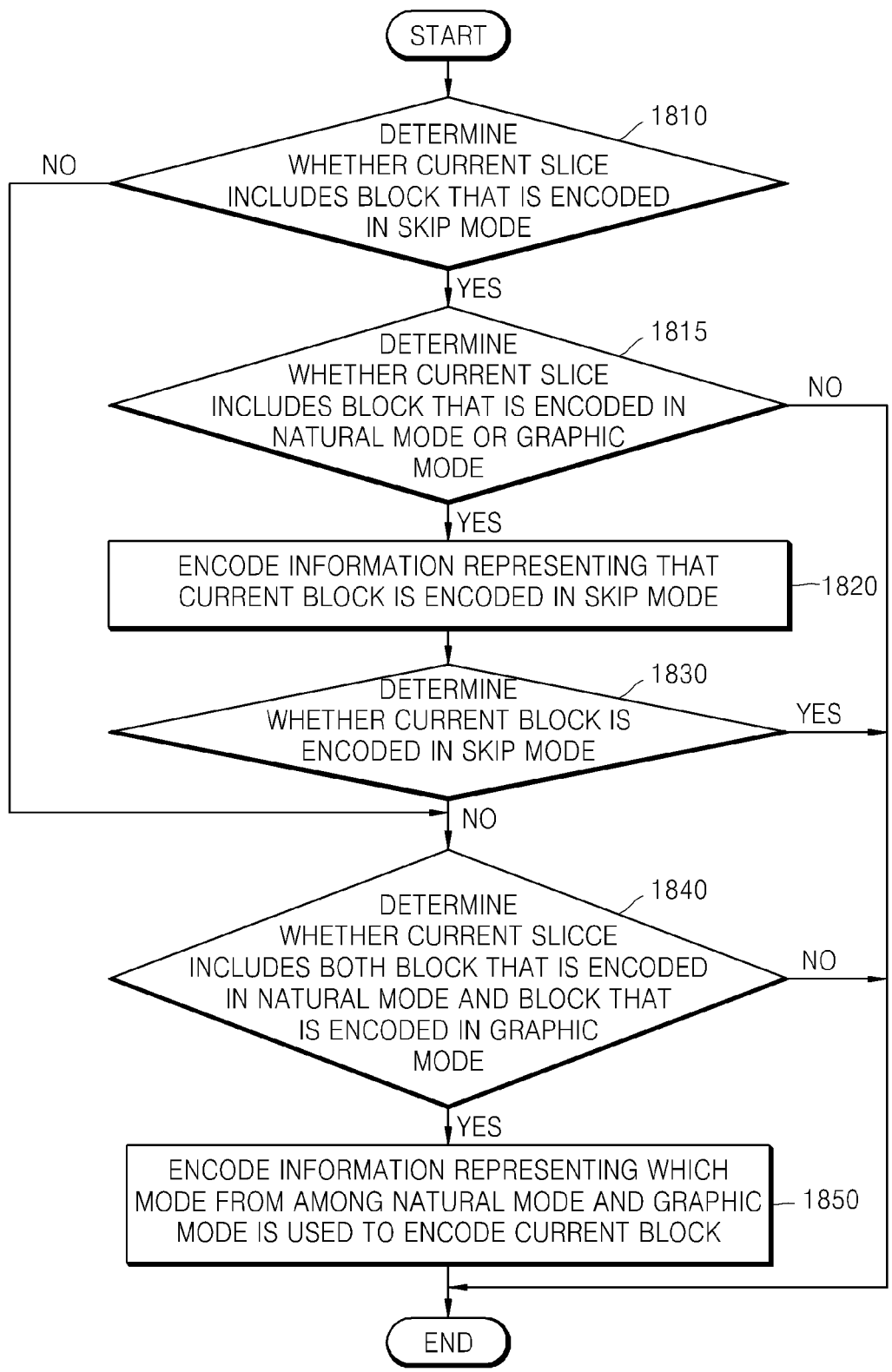
FIG. 18 is a flowchart illustrating a method of encoding mode information, according to another exemplary embodiment.

FIG. 18 is a flowchart illustrating a method of encoding mode information, according to another embodiment of the present invention.

FIG. 18 is another detailed flowchart illustrating operation 1560 of the method of FIG. 15.

The method of FIG. 18 and the method of FIG. 17 are different from each other in that operation 1815 is added. All other operations 1820 through 1850 respectively correspond to operations 1720 through 1750 of FIG. 17. In FIG. 17, the first information is encoded even when the current slice includes only the block that is encoded in the skip mode. However, in FIG. 18, operation 1815 is added and thus the first information is not encoded when the current slice includes only the block that is encoded in the skip mode.

Mode information encoded according to the method of FIG. 18 may be as shown in Table 1.

| Skip_mode_used | Nat_mode_used | Graphic_mode_used | First information | Second information |
| --- | --- | --- | --- | --- |
| 0 | 0 | 1 | Not encoded | Not encoded |
| 0 | 1 | 0 | Not encoded | Not encoded |
| 0 | 1 | 1 | Not encoded | 0 1 |
| 1 | 0 | 0 | Not encoded | Not encoded |
| 1 | 0 | 1 | 0 1 | Not encoded |
| 1 | 1 | 0 | 0 1 | Not encoded |
| 1 | 1 | 1 | 0 1 | 0 1 Not encoded |

The 'skip_mode_used' field, which is flag information indicating that the current slice includes a block that is encoded in the skip mode, corresponds to the third information. The 'nat_mode_used' field is flag information indicating that the current slice includes a block that is encoded in the natural mode, and the 'graphic_mode_used' field is flag information indicating that the current slice includes a block that is encoded in the graphic mode. The 'nat_mode_used' and 'graphic_mode_used' fields correspond to the fourth information. The first information is flag information indicating that the current block is encoded in the skip mode, and the second information is flag information indicating which mode from among the natural mode and the graphic mode is used to encode the current block.

Figure 19:
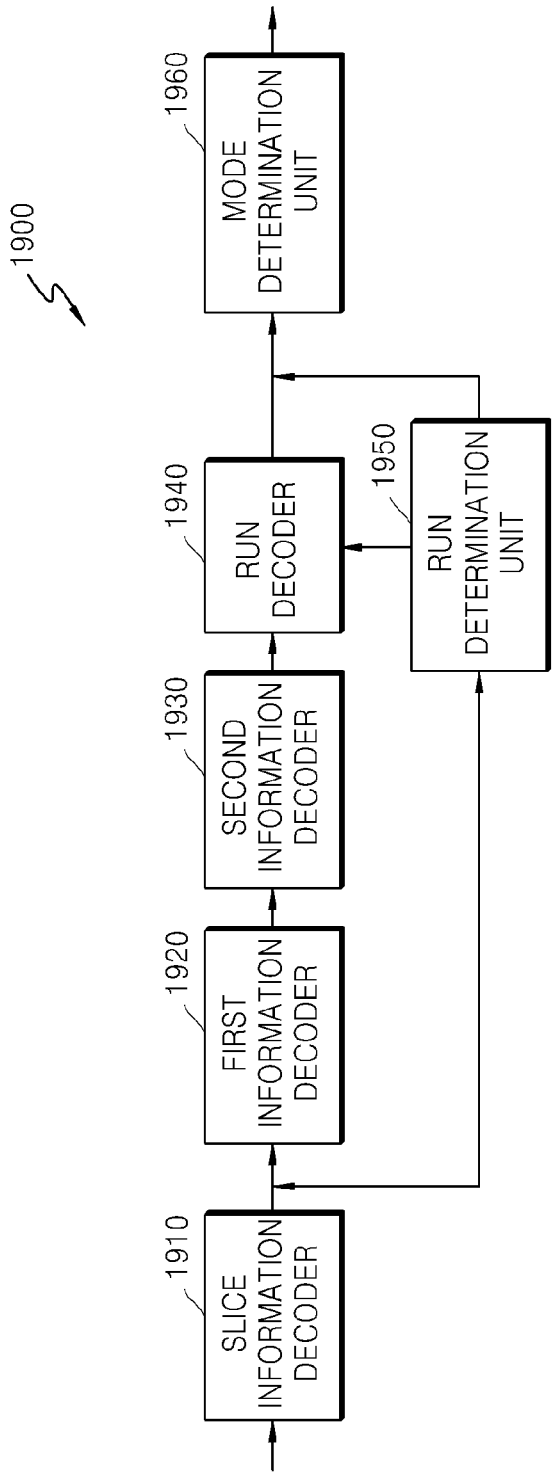
FIG. 19 is a block diagram of an apparatus for decoding mode information, according to an exemplary embodiment.

FIG. 19 is a block diagram of an apparatus 1900 for decoding mode information, according to an exemplary embodiment.

The apparatus 1900 of FIG. 19 corresponds to the mode information decoder 810 of FIG. 8 and the mode information decoder 910 of FIG. 9.

Referring to FIG. 19, the apparatus 1900 includes a slice information decoder 1910, a first information decoder 1920, a second information decoder 1930, a run decoder 1940, a run determination unit 1950, and a mode determination unit 1960.

The slice information decoder 1910 parses, from a bitstream, third information indicating that a current slice includes a block that is encoded in a skip mode, and fourth information, e.g., flag information, indicating that the current slice includes a block that is encoded in a natural mode and a flag information, indicating that the current slice includes a block that is encoded in a graphic mode.

If the run determination unit 1950 determines that a current block is not encoded in an encoding mode identical to the encoding modes of a plurality of consecutive previous blocks, the first information decoder 1920 parses first information indicating that the current block is encoded in the skip mode. The first information may be flag information indicating that the current block is encoded in the skip mode. If the current block is encoded in the skip mode, the flag information may be '1', and if the current block is not encoded in the skip mode, the flag information may be '0'.

Alternatively, the first information decoder 1920 may selectively parse the first information based on whether the current slice includes a block that is encoded in the skip mode. If the current slice does not include the block that is encoded in the skip mode, since it is obvious that all blocks of the current slice are not encoded in the skip mode, the apparatus 1300 does not encode the first information. Accordingly, if the current slice does not include the block that is encoded in the skip mode, the first information for each of the blocks does not need to be parsed. Accordingly, the first information decoder 1920 parses the first information for each of the blocks only when the current slice includes the block that is encoded in the skip mode.

Alternatively, even when the current slice includes the block that is encoded in the skip mode, the apparatus 1300 encodes the first information only when the current slice includes a block that is encoded in the natural mode or a block that is encoded in the graphic mode. Accordingly, the first information decoder 1920 may parse the first information only when the current slice includes the block that is encoded in the natural mode or the block that is encoded in the graphic mode, by referring to the fourth information that is encoded by the slice information decoder 1910.

Like the first information decoder 1920, the second information decoder 1930 decodes the second information only when the run determination unit 1950 determines that the current block is not encoded in an encoding mode identical to the encoding modes of a plurality of consecutive previous blocks.

If the current block is encoded in the skip mode, since the first information decoder 1920 already parses information about the skip mode, and it is determined that a mode used to decode the current block is the skip mode, information about the natural mode and the graphic mode does not need to be parsed. Accordingly, if it is determined that the current block is not encoded in the skip mode, the second information decoder 1930 parses the second information indicating which mode from among the natural mode and the graphic mode is used to encode the current block. The second information may be flag information for specifying an encoding mode of the current block from among the natural mode and the graphic mode.

Also, the second information decoder 1930 may selectively parse the second information by referring to the fourth information decoded by the slice information decoder 1910. If the current slice includes only a block that is encoded in the natural mode, since it is obvious that the current block is a block that is encoded in the natural mode and the apparatus 1300 does not encode the second information, the second information decoder 1930 does not need to parse the second information. Also, if the current slice includes only a block that is encoded in the graphic mode, since it is obvious that the current block is a block that is encoded in the graphic mode and the apparatus 1300 does not encode the second information, the second information decoder 1930 does not need to parse the second information.

In short, the second information decoder 1930 parses the second information only when the current slice includes both the block that is encoded in the natural mode and the block that is encoded in the graphic mode, by referring to the fourth information.

The run decoder 1940 parses information about a run length indicating the number of times an identical encoding mode is repeated. If the information about the run length is included in the bitstream, the information about the run length is parsed and provided to the run determination unit 1950.

The run determination unit 1950 determines whether the current block is encoded in an encoding mode identical to encoding modes of a plurality of consecutive previous blocks. If the current block is a $k^{th}$ block of the current slice, it is determined whether a $k-1^{th}$ block and a $k-2^{th}$ block, which are a plurality of consecutive previous blocks, are encoded in identical encoding modes to an encoding mode of the $k^{th}$ block. If it is determined that the $k-1^{th}$ block and the $k-2^{th}$ block are encoded in the identical encoding modes to the encoding mode of the $k^{th}$ block, information about the run length is parsed by the run decoder 1940.

If the information about the run length is not included in the bitstream or the parsed information about the run length has a value of '0', it is determined that the current block is not encoded in the encoding mode identical to the encoding modes of the plurality of consecutive previous blocks. If the information about the run length is parsed and a value of the run length is greater than '0', it is determined that the current block is encoded in the encoding mode identical to the encoding modes of the plurality of consecutive previous blocks.

The run determination unit 1950 of the apparatus 1900 corresponds to the run determination unit 1310 of the apparatus 1300. Accordingly, the run determination unit 1950 may determine all of whether the skip mode is repeated, the natural mode is repeated, and the graphic mode is repeated, or only whether the skip mode is repeated, like the run determination unit 1310.

Also, whether a combination of two modes is repeated may be determined. The combination of the two modes may be a combination of the skip mode and the graphic mode, a combination of the skip mode and the natural mode, or a combination of the natural mode and the graphic mode.

The mode determination unit 1960 determines a mode used to decode the current block based on at least one of the first information decoded by the first information decoder 1920, the second information decoded by the second information decoder 1930, and the information about the run length decoded by the run decoder 1940. It is initially determined whether the mode used to decode the current block is the skip mode based on the first information, and if it is determined that the mode used to decode the current block is not the skip mode, then it is determined whether the current mode is to be decoded in the natural mode or the graphic mode based on the second information.

If the run determination unit 1950 determines that the current block is encoded in the encoding mode identical to the encoding modes of the plurality of consecutive previous blocks, it is determined that a decoding mode of the current block is identical to decoding modes of the previous blocks.

Figure 20:
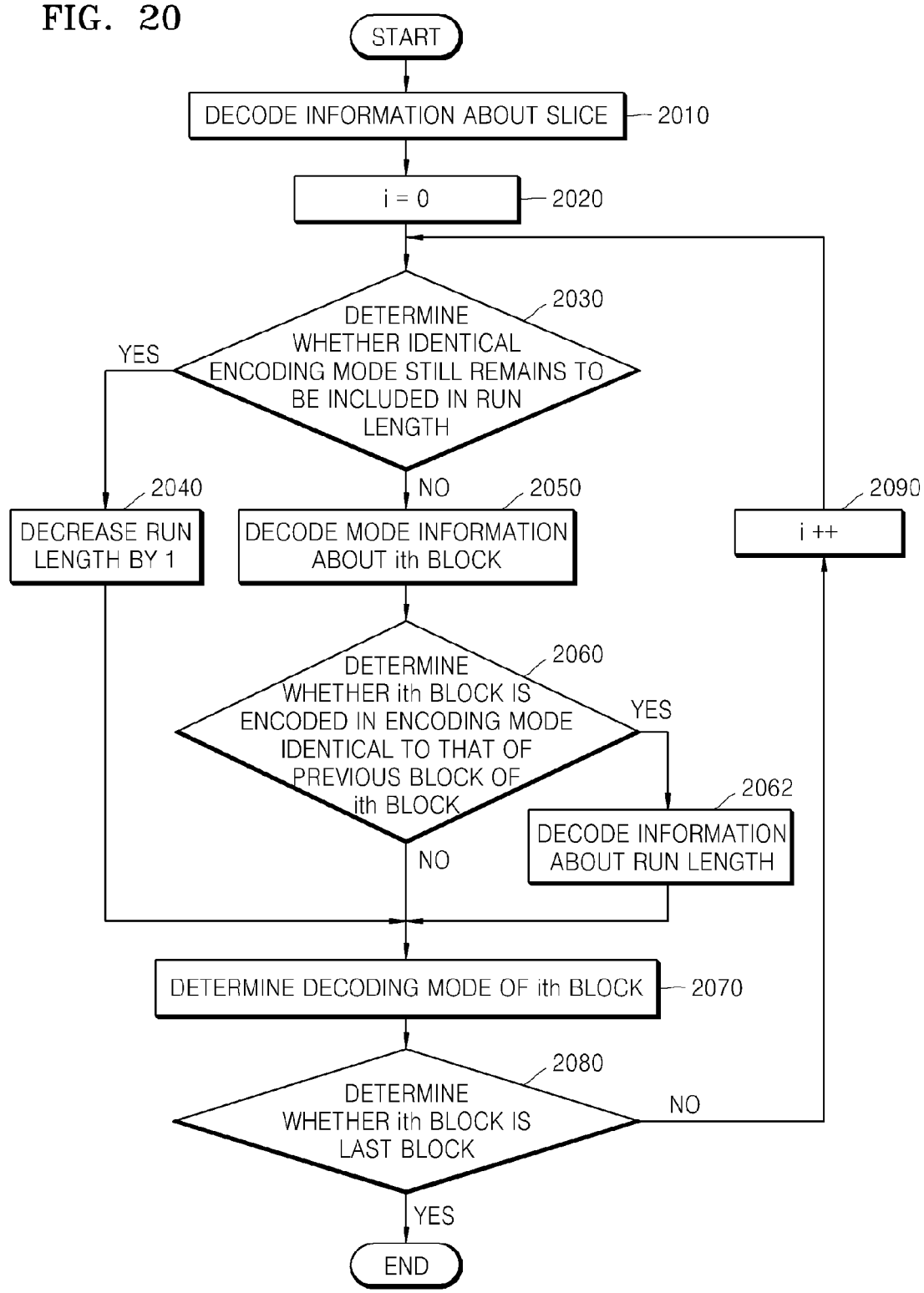
FIG. 20 is a flowchart illustrating a method of decoding mode information, according to an exemplary embodiment.

FIG. 20 is a flowchart illustrating a method of decoding mode information, according to an exemplary embodiment.

Referring to FIG. 20, in operation 2010, an apparatus 1900 parses, from a bitstream, third information indicating that a current slice includes a block that is encoded in a skip mode, and fourth information indicating that the current slice includes a block that is encoded in a natural mode and a block that is encoded in a graphic mode.

In operation 2020, the apparatus 1900 sets an index 'i' indicating an order of a block to '0'.

In operation 2030, the apparatus 1900 determines whether an $i^{th}$ block is encoded in an encoding mode identical to encoding modes of a plurality of consecutive blocks which are decoded prior to the $i^{th}$ block. It is determined whether an identical encoding mode still remains to be included in the run length by referring to information about a run length indicating the number of times an identical encoding mode is repeated. If the run length is greater than '0', it may be determined that the identical encoding mode remains to be included in the run length. If the run length is greater than '0', in operation 2040, the run length is decreased by '1'.

If an identical encoding mode does not remain to be included in the run length, that is, the run length is '0', since the $i^{th}$ block is not encoded in an encoding mode identical to the encoding modes of the plurality of consecutive previous blocks. In operation 2050, the apparatus 1900 parses information about the encoding mode of the $i^{th}$ block. The apparatus 1900 may parse first information indicating that the $i^{th}$ block is encoded in the skip mode, and second information indicating which mode from among the natural mode and the graphic mode is used to encode the current block, which will be explained in detail with reference to FIGS. 21 through 23.

In operation 2060, the apparatus 1900 determines whether the $i^{th}$ block is encoded in an encoding mode identical to that of a previous block of the $i^{th}$ block, that is, an $i-1^{th}$ block. If it is determined in operation 2060 that the $i^{th}$ block is encoded in the encoding mode identical to that of the $i-1^{th}$ block, since the plurality of consecutive blocks are encoded in the identical encoding mode, it may be known that a next block, that is, an $i+1^{th}$ block also may be encoded in the identical encoding mode.

Accordingly, in order to determine an encoding mode of a next block, in operation 2062, the apparatus 1900 parses information about a run length indicating the number of times the identical encoding mode is repeated. If the $i+1^{th}$ block is encoded in the identical encoding mode as that of the $i^{th}$ block, information about the run length is parsed in operation 2062, and if the $i+1^{th}$ block is not encoded in the encoding mode identical to that of the $i^{th}$ block, since there is no information about the run length to be parsed, the run length, whether parsed or not parsed, has a value of '0'.

In operation 2070, the apparatus 1900 determines a decoding mode of the $i^{th}$ block. If it is determined that the $i^{th}$ block is encoded in the encoding mode identical to the encoding modes of the plurality of consecutive previous blocks and it is determined in operation 2030 that the identical encoding mode still remains to be included in the run length, the decoding mode of the $i^{th}$ block is determined in the same manner as that used to determine the decoding mode of the $i-1^{th}$ block. If it is determined in operation 2030 that the identical encoding mode no longer remains to be included in the run length and the first information and the second information are parsed in operation 2050, the decoding mode of the $i^{th}$ block is determined based on the first information and the second information.

In operation 2080, the apparatus 1900 determines whether the $i^{th}$ block is a last block. If it is determined in operation 2080 that the $i^{th}$ block is not the last block, the method proceeds to operation 2090. In operation 2090, the index 'i' is increased by '1', and operations 2030 through 2070 are repeated.

Figure 21:
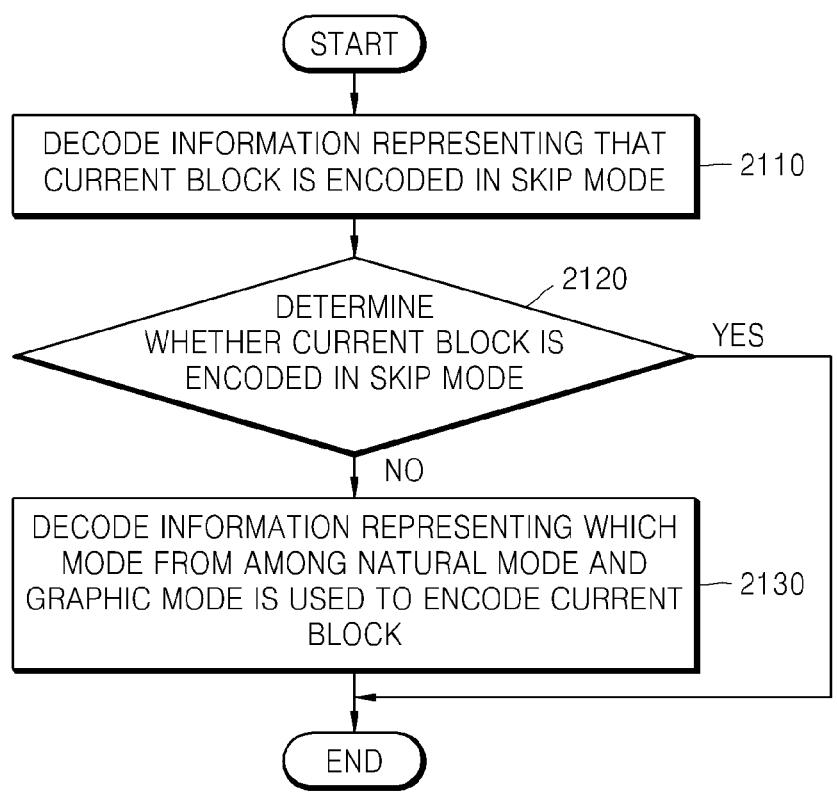
FIG. 21 is a flowchart illustrating a method of decoding mode information, according to another exemplary embodiment.

FIG. 21 is a flowchart illustrating a method of decoding mode information, according to another exemplary embodiment.

FIG. 21 is a detailed flowchart illustrating operation 2050 of the method of FIG. 20.

Referring to FIG. 21, in operation 2110, the apparatus 1900 decodes the first information indicating that the current block is encoded in the skip mode. The first information is parsed from the bitstream.

In operation 2120, the apparatus 1900 determines whether the current block is encoded in the skip mode based on the first information decoded in operation 2110.

If it is determined in operation 2120 that the current block is not encoded in the skip mode, the method proceeds to operation 2130. In operation 2130, the apparatus 1900 decodes the second information indicating which mode from among the natural mode and the graphic mode is used to encode the current block. The second information is parsed from the bitstream.

Figure 22:
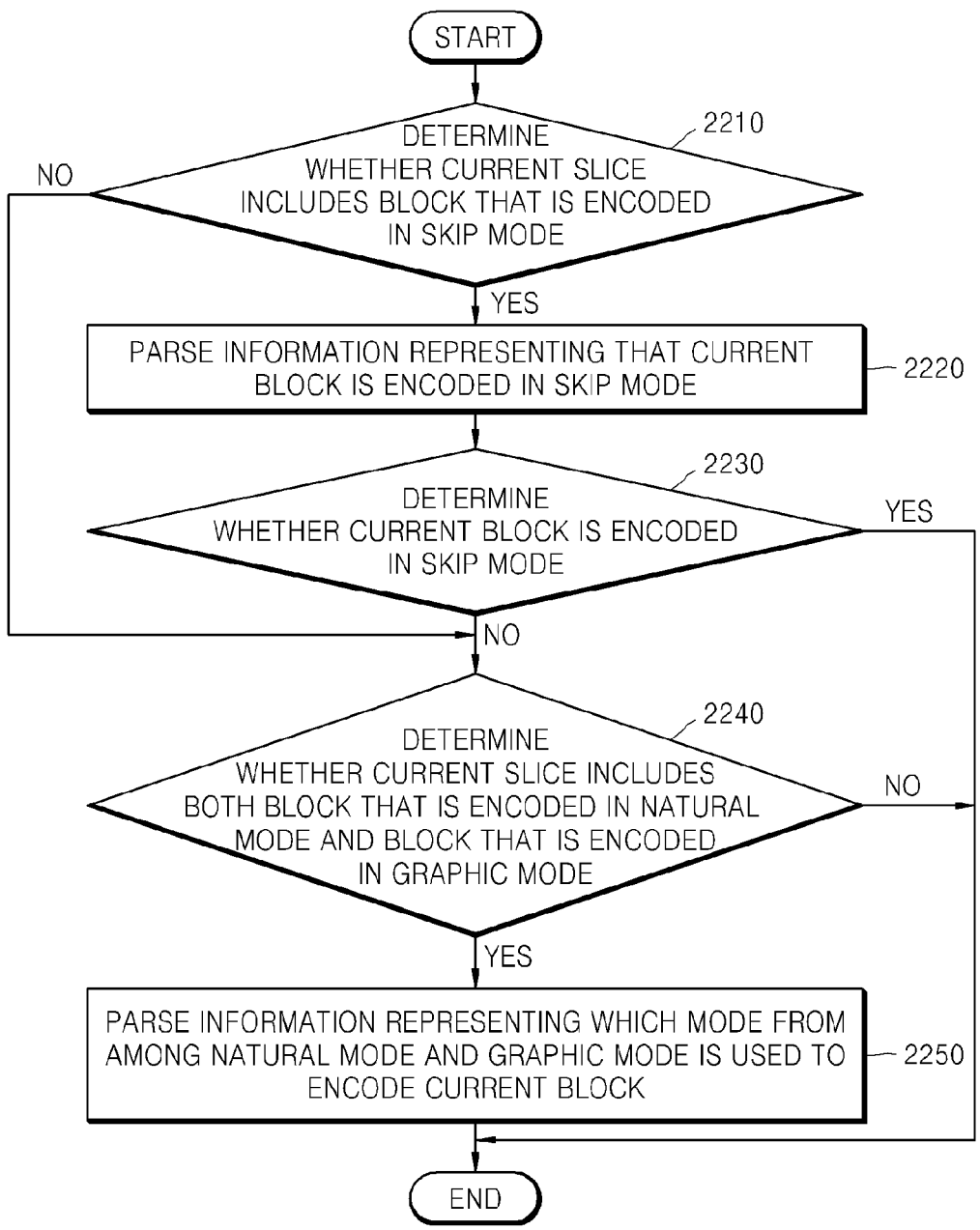
FIG. 22 is a flowchart illustrating a method of decoding mode information, according to another exemplary embodiment.

FIG. 22 is a flowchart illustrating a method of decoding mode information, according to another exemplary embodiment.

FIG. 22 is another detailed flowchart illustrating operation 2050 of the method of FIG. 20.

Referring to FIG. 22, in operation 2210, the apparatus 1900 determines whether a current slice includes a block that is encoded in the skip mode. It is determined whether the current slice includes the block that is encoded in the skip mode based on the parsed third information. If the current slice does not include the block that is encoded in the skip mode, the first information indicating that the current block is encoded in the skip mode does not need to be parsed.

If it is determined in operation 2210 that the current slice includes the block that is encoded in the skip mode, the method proceeds to operation 2220. In operation 2220, the apparatus 1900 parses the first information indicating that the current block is encoded in the skip mode In operation 2230, the apparatus 1900 determines whether the current block is encoded in the skip mode. It is determined whether the current block is encoded in the skip mode based on the first information parsed in operation 2220. If the current block is encoded in the skip mode, information indicating which mode from among the natural mode and the graphic mode is used to encode the current block does not need to be parsed.

In operation 2240, the apparatus 1900 determines whether the current slice includes both a block that is encoded in the natural mode and a block that is encoded in the graphic mode, based on the parsed fourth information. If the current slice includes only the block that is encoded in the natural mode, since it is obvious that the current block is a block that is encoded in the natural mode, the second information indicating which mode from among the natural mode and the graphic mode is used to encode the current block does not need to be parsed. Also, if the current slice includes only the block that is encoded in the graphic mode, since it is obvious that the current block is a block that is encoded in the graphic mode, the second information does not need to be parsed.

In operation 2250, the apparatus 1900 parses the second information indicating which mode from among the natural mode and the graphic mode is used to encode the current block.

Figure 23:
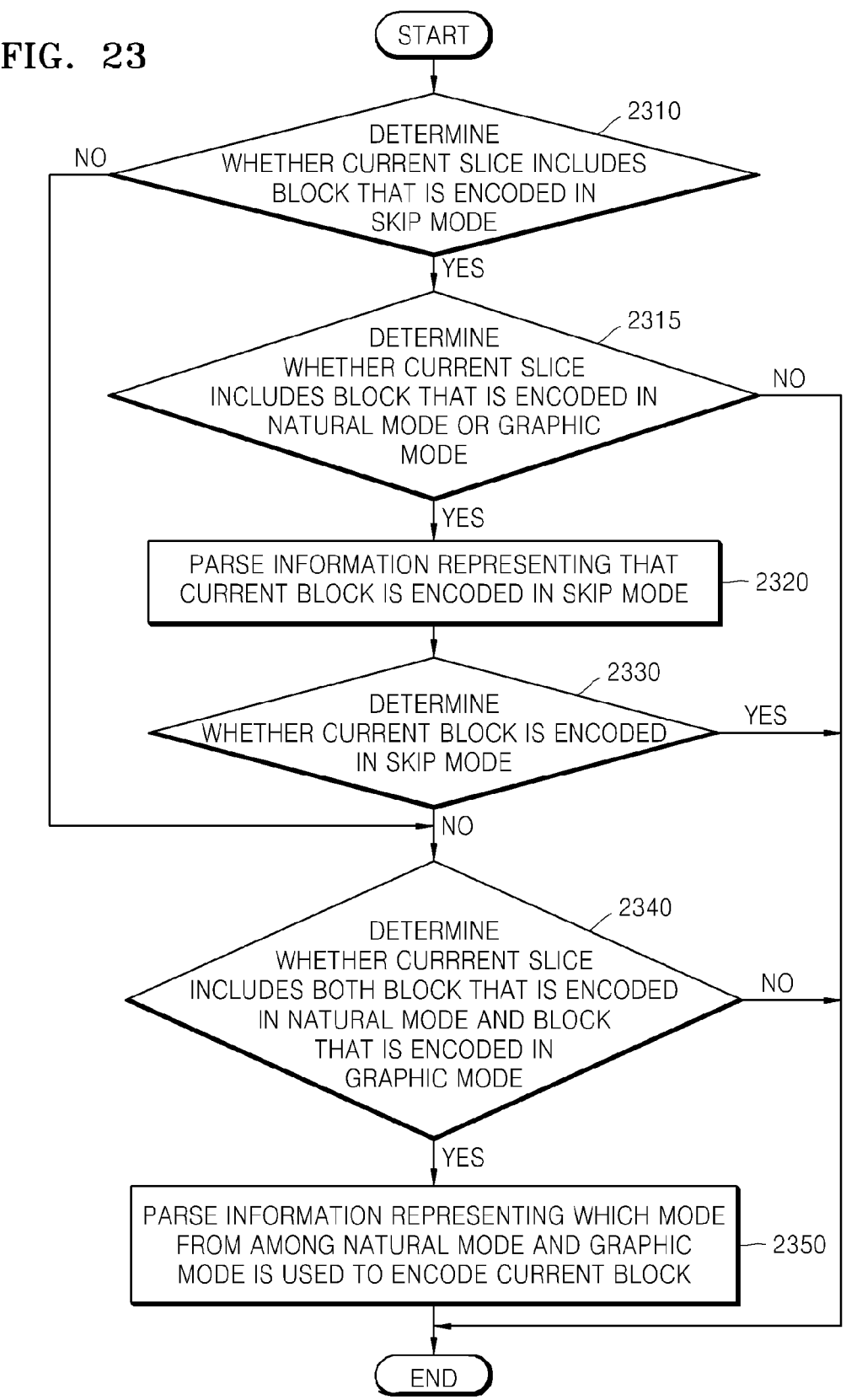
FIG. 23 is a flowchart illustrating a method of decoding mode information, according to another exemplary embodiment.

FIG. 23 is a flowchart illustrating a method of decoding mode information, according to another exemplary embodiment.

FIG. 23 is another detailed flowchart illustrating operation 2050 of the method of FIG. 20.

The method of FIG. 23 and the method of FIG. 22 are different from each other in that operation 2315 is added. All other operations 2320 through 2350 respectively correspond to operations 2220 through 2250 of FIG. 22. Referring to FIG. 22, the first information is parsed even when the current slice includes only the block that is encoded in the skip mode. However, referring to FIG. 23, operation 2315 is added and thus the first information is not parsed when the current slice includes only the block that is encoded in the skip mode.

While exemplary embodiments have been particularly shown and described, it will be understood by one of ordinary skill in the art that various changes in form and details may be made therein without departing from the spirit and scope of the invention as defined by the following claims and their equivalents. The exemplary embodiments can also be embodied as computer-readable codes on a computer-readable recording medium. The computer-readable recording medium is any data storage device that can store data, which can be thereafter read by a computer system to execute the computer readable codes stored thereon.

The apparatus for encoding the image, the apparatus for decoding the image, the apparatus for encoding the mode information, and the apparatus for decoding the mode information illustrated in FIGS. 1, 4, 7, 8, 9, 13, and 19 may include a bus coupled to every unit of the apparatus, at least one processor connected to the bus, and memory connected to the bus to store commands, received messages, and generated messages, and the processor executes the commands and controls the operations of the apparatuses.

Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. In an alternative embodiment, the exemplary embodiments can also be embodied as computer readable transmission media, such as carrier waves, for transmission over a network.

What is claimed is:

1. A method of decoding mode information of a current block of an image, the method comprising:
    determining whether an encoding mode of the current block is identical to both a first previous encoding mode of a first previously encoded block and a second previous encoding mode of a second previously encoded block, the first previously encoded block and the second previously encoded block being consecutive;
    in response to determining that the encoding mode of the current block is identical to both the first previous encoding mode and the second previous encoding mode, determining that a decoding mode of the current block is identical to the first previous encoding mode and the second previous encoding mode; and
    in response to determining that the encoding mode of the current block is not identical to both the first previous encoding mode and the second previous encoding mode, parsing at least one of first information indicating that the encoding mode of the current block is a first encoding mode and second information indicating that the encoding mode of the current block is one of a second encoding mode and a third encoding mode, and determining a decoding mode of the current block based on the at least one of the parsed first information and the parsed second information,
    wherein the first encoding mode indicates that the current block is identical to a second block that is encoded prior to the current block, the current block adjacent to the second block in a slice of the image.

2. The method of claim 1, wherein the parsing of the at least one of the first information and the second information and the determining the decoding mode comprises:
    parsing the first information;
    determining whether the encoding mode of the current block is the first encoding mode;
    in response to determining that encoding mode of the current block is not the first encoding mode, parsing the second information; and
    determining the decoding mode of the current block based on a result of the decoding the at least one of the first information and the second information.

3. The method of claim 2, wherein the second encoding mode is an encoding mode in which discrete cosine transformation (DCT) is performed on pixel values of the current block to generate coefficients, the coefficients are separated into a plurality of bit planes from a bit plane of most significant bits to a bit plane of least significant bits, and each of the plurality of bit planes is encoded.

4. The method of claim 2, wherein the third encoding mode is an encoding mode in which pixel values of the current block are separated into a plurality of bit planes from a bit plane of most significant bits to a bit plane of least significant bits and each of the plurality of bit planes is encoded.

5. The method of claim 1, wherein the determining whether the encoding mode of the current block is identical to both the first previous encoding mode and the second previous encoding mode is based on information about a run length that indicates a number of times a predetermined encoding mode is repeated, and
    wherein the method further comprises: in response to determining that the encoding mode of the current block is identical to both the first previous encoding mode and the second previous encoding mode, parsing the information about the run length for blocks encoded subsequent to the current block having the identical encoding mode.

6. The method of claim 5, wherein the information about the run length comprises information about run lengths for a plurality of encoding modes that may be used to encode the current block.

7. A method of encoding mode information of a current block of an image, the method comprising:
    determining an encoding mode of the current block;
    determining whether the encoding mode of the current block is identical to both a first previous encoding mode of a first previously encoded block and a second previous encoding mode of a second previously encoded block, the first previously encoded block and the second previously encoded block being consecutive;
    in response to determining that the encoding mode of the current block is identical to both the first previous encoding mode and the second previous encoding mode, encoding information about a run length of the identical encoding mode; and
    in response to determining that the encoding mode of the current block is not identical to both the first previous encoding mode and the second previous encoding mode, encoding at least one of first information indicating that the encoding mode of the current block is a first encoding mode and second information indicating that the encoding mode of the current block is one of a second encoding mode and a third encoding mode,
    wherein the first encoding mode indicates that the current block is identical to a second block that is encoded prior to the first block, the current block adjacent to the second block in a slice of the image.

8. The method of claim 7, wherein the encoding of the at least one of the first information and the second information comprises:
- encoding the first information;
- determining that the current block is not encoded in the first encoding mode; and
- in response to determining that the current block is not encoded in the first encoding mode, encoding the second information.

9. The method of claim 8, wherein the second encoding mode is an encoding mode in which DCT is performed on pixel values of the current block to obtain coefficients, the coefficients are separated into a plurality of bit planes from a bit plane of most significant bits to a bit plane of a least significant bits, and each of the plurality of bit planes is encoded.

10. The method of claim 8, wherein the third encoding mode is an encoding mode in which pixel values of the current block are separated into a plurality of bit planes from a bit plane of most significant bits to a bit plane of least significant bits and each of the plurality of bit planes is encoded.

11. The method of claim 7, wherein information about the run length is information that indicates a number of times a predetermined encoding mode is repeated, and
wherein the method further comprises: in response to determining that the encoding mode of the current block is identical to both the first previous encoding mode and the second previous encoding mode, encoding the run length for blocks encoded subsequent to the current block having the identical encoding mode.

12. The method of claim 11, wherein information about the run length comprises information about run lengths of a plurality of encoding modes that may be used to decode the current block.

13. An apparatus for decoding mode information of a current block of an image, the apparatus comprising:
- a run determination unit that determines whether an encoding mode of the current block is identical to both a first previous encoding mode of a first previously encoded block and a second previous encoding mode of a second previously encoded block, the first previously encoded block and the second previously encoded block being consecutive; and
- a mode determination unit that, in response to the run determination unit determining that the encoding mode of the current block is identical to both the first previous encoding mode and the second previous encoding mode, determines that a decoding mode of the current block is identical to the first previous encoding mode and the second previous encoding mode, and in response to the run determination unit determining that the encoding mode of the current block is not identical to both the first previous encoding mode and the second previous encoding mode, determines a decoding mode of the current block based on at least one of first information indicating that the encoding mode of the current block a first encoding mode and second information indicating that the encoding mode of the current block is one of a second encoding mode and a third encoding mode,
wherein the first encoding mode indicates that the current block is identical to a second block that is encoded prior to the current block, the current block adjacent to the second block in a slice of the image.

14. The apparatus of claim 13, wherein information about the run length is information that indicates a number of times a predetermined encoding mode is repeated.

15. An apparatus for encoding mode information of a current block of an image, the apparatus comprising:
- a run determination unit that determines whether an encoding mode of the current block is identical to both a first previous encoding mode of a first previously encoded block and a second previous encoding mode of a second previously encoded block, the first previously encoded block and the second previously encoded block being consecutive;
- a run encoder that, in response to the run determination unit determining that the encoding mode of the current block is identical to both the first previous encoding mode and the second previous encoding mode, encodes information about a run length of the identical encoding mode;
- an information encoder that, in response to the run determination unit determining that the encoding mode of the current block is not identical to both the first previous encoding mode and the second previous encoding mode, encodes at least one of first information indicating that the current block is encoded in a first encoding mode and second information indicating that the encoding mode of the current block is one of a second encoding mode and a third encoding mode,
wherein the first encoding mode indicates that the current block is identical to a second block that is encoded prior to the first block, the current block adjacent to the second block in a slice of the image.

16. The apparatus of claim 15, wherein the information about the run length is information that indicates a number of times a predetermined encoding mode is repeated.

17. A non-transitory computer-readable recording medium having embodied thereon a program for executing the method of claim 1.

18. A non-transitory computer-readable recording medium having embodied thereon a program for executing the method of claim 7.

* * * * *